US012695713B2

(12) United States Patent
    Mikhailiuk et al.

(10) Patent No.:  US 12,695,713 B2
(45) Date of Patent:      Jul. 28, 2026

(54) CHATBOT RESPONSE SYSTEM

(71) Applicant: Snap Inc., Santa Monica, CA (US)

(72) Inventors: Aliaksei Mikhailiuk, London (GB);
              Sergey Smetanin, London (GB); **Pavel
              Savchenkov, London (GB); Hee Hun
              Kim, Los Angeles, CA (US); Tianxiang
              Gao, Bothell, WA (US); Neha Yadav**,
              Seattle, WA (US); Bingqian Lu,
              Ontario, CA (US); Emily Ann Claudet,
              London (GB)

(73) Assignee: Snap Inc., Santa Monica, CA (US)

( * ) Notice:    Subject to any disclaimer, the term of this
              patent is extended or adjusted under 35
              U.S.C. 154(b) by 0 days.

(21) Appl. No.: 18/388,153

(22) Filed:     Nov. 8, 2023

(65)              Prior Publication Data

US 2025/0150414 A1      May 8, 2025

(51) Int. Cl.
     G06F 15/16          (2006.01)
     G06F 40/30          (2020.01)
                (Continued)
(52) U.S. Cl.
     CPC .............. H04L 51/02 (2013.01); G06F 40/30
              (2020.01); G06V 30/153 (2022.01); **H04L
                              51/063** (2013.01)
(58) Field of Classification Search
     CPC ....... H04L 51/02; H04L 51/063; G06F 40/30;
                              G06V 30/153
     See application file for complete search history.

(56)              References Cited

U.S. PATENT DOCUMENTS 10,565,634 B2 *  2/2020  Talmor ................. G06F 40/106
10,599,774 B1 *  3/2020  Luo ...................... G06N 3/0455
                (Continued)

FOREIGN PATENT DOCUMENTS

JP        2025049411      4/2025
WO        2024158821      8/2024
                (Continued)

OTHER PUBLICATIONS

"International Application Serial No. PCT/US2024/012626, Inter-
national Search Report mailed Apr. 4, 2024", 4 pgs.
                (Continued)

*Primary Examiner* — Suraj M Joshi
*Assistant Examiner* — Hao H Nguyen
(74) *Attorney, Agent, or Firm* — Schwegman Lundberg &
Woessner, P.A.

(57)              ABSTRACT
A computer-implemented method and system for respond-
ing to user posts containing images with relevant image
responses during conversation between a user and a chatbot.
The system receives an image post from the user and
generates a description of the image using an image-to-text
model. User intent is determined based on the image and
description. If responding with an image is appropriate
based on the user intent, the system generates a prompt using
the image description and passes it to a text generation
model to create an image description and caption. The image
description and caption are used to synthesize a new image.
The resulting image and caption are packaged into a post
that is provided as a response to the user. The system uses
machine learning pipelines and models to analyze images,
detect inappropriate content, classify user intent, generate
text, and synthesize images.

17 Claims, 14 Drawing Sheets

(51) Int. Cl.
*G06V 30/148* (2022.01)
*H04L 51/02* (2022.01)
*H04L 51/063* (2022.01)

(56) References Cited

U.S. PATENT DOCUMENTS

| | | | |
|---|---|---|---|
| 10,750,019 B1 | 8/2020 | Petrovykh et al. | |
| 10,769,560 B1* | 9/2020 | Knas | G06Q 10/107 |
| 11,966,704 B1* | 4/2024 | Magary | G06F 40/30 |
| 12,010,076 B1* | 6/2024 | Andrew | H04L 51/02 |
| 12,039,612 B1* | 7/2024 | Zumpano | G06Q 40/08 |
| 2013/0080928 A1 | 3/2013 | Zhuang et al. | |
| 2014/0164305 A1 | 6/2014 | Lynch et al. | |
| 2016/0378861 A1 | 12/2016 | Eledath et al. | |
| 2017/0169476 A1 | 6/2017 | Nomula et al. | |
| 2017/0250930 A1 | 8/2017 | Ben-itzhak | |
| 2019/0043106 A1* | 2/2019 | Talmor | G06N 20/00 |
| 2019/0050427 A1 | 2/2019 | Wiesel et al. | |
| 2019/0073197 A1 | 3/2019 | Collins | |
| 2019/0143527 A1 | 5/2019 | Favis et al. | |
| 2019/0147366 A1 | 5/2019 | Sankaran et al. | |
| 2019/0171845 A1 | 6/2019 | Dotan-cohen et al. | |
| 2019/0172454 A1* | 6/2019 | Kitajima | G06F 3/167 |
| 2019/0193273 A1 | 6/2019 | Favis et al. | |
| 2019/0317709 A1 | 10/2019 | Sugimoto et al. | |
| 2019/0340485 A1 | 11/2019 | Ngo et al. | |
| 2020/0104653 A1 | 4/2020 | Solomon et al. | |
| 2020/0125678 A1 | 4/2020 | Conley et al. | |
| 2020/0236228 A1* | 7/2020 | Awatsu | H04L 51/52 |
| 2020/0242305 A1 | 7/2020 | Wu | |
| 2020/0327327 A1* | 10/2020 | Wu | G06V 30/274 |
| 2021/0067470 A1* | 3/2021 | Freed | G06F 18/23 |
| 2021/0136019 A1 | 5/2021 | Price et al. | |
| 2021/0144264 A1* | 5/2021 | Toda | H04L 51/02 |
| 2021/0150806 A1 | 5/2021 | Guler et al. | |
| 2021/0295203 A1 | 9/2021 | Liao et al. | |
| 2021/0297498 A1 | 9/2021 | Divakaran et al. | |
| 2022/0058347 A1 | 2/2022 | Singaraju et al. | |
| 2022/0114751 A1 | 4/2022 | Kannan et al. | |
| 2022/0199079 A1 | 6/2022 | Hanson et al. | |
| 2022/0237368 A1 | 7/2022 | Tran | |
| 2023/0096474 A1* | 3/2023 | Krishnan | G06N 3/0464 |
| | | | 726/26 |
| 2023/0111489 A1 | 4/2023 | Zohar et al. | |
| 2023/0115551 A1 | 4/2023 | Jin et al. | |
| 2023/0154453 A1* | 5/2023 | Erdenee | H04L 51/02 |
| | | | 704/231 |
| 2023/0252975 A1* | 8/2023 | Vishnoi | H04L 51/02 |
| | | | 704/260 |
| 2023/0315999 A1* | 10/2023 | Mohammed | G06F 16/345 |
| | | | 704/9 |
| 2024/0012841 A1* | 1/2024 | Voyles | G06F 40/40 |
| 2024/0020478 A1* | 1/2024 | Will, IV | H04L 51/02 |
| 2024/0020484 A1* | 1/2024 | Will, IV | G06F 40/35 |
| 2024/0127026 A1* | 4/2024 | Manandise | G06N 3/006 |
| 2024/0163232 A1 | 5/2024 | Jayaraman et al. | |
| 2024/0211826 A1 | 6/2024 | Rewerenda et al. | |
| 2024/0242033 A1* | 7/2024 | Intrator | G06V 30/14 |
| 2024/0249318 A1 | 7/2024 | Spiegel et al. | |
| 2024/0267344 A1 | 8/2024 | Mulligan et al. | |
| 2024/0291779 A1 | 8/2024 | Catalano et al. | |
| 2024/0355010 A1 | 10/2024 | Ahafonov et al. | |
| 2024/0355064 A1 | 10/2024 | Skrypnyk et al. | |
| 2024/0355065 A1 | 10/2024 | Miller et al. | |
| 2024/0355131 A1 | 10/2024 | Kuppersmith et al. | |
| 2024/0356871 A1 | 10/2024 | Brewer et al. | |
| 2024/0356873 A1 | 10/2024 | Brewer et al. | |
| 2024/0394593 A1* | 11/2024 | Gutierrez | G06N 5/022 |
| 2024/0428345 A1* | 12/2024 | Sami | G06Q 30/0254 |

FOREIGN PATENT DOCUMENTS

| | | |
|---|---|---|
| WO | 2024167840 | 8/2024 |
| WO | 2024178247 | 8/2024 |
| WO | 2024220281 | 10/2024 |
| WO | 2024220287 | 10/2024 |
| WO | 2024220305 | 10/2024 |
| WO | 2024220327 | 10/2024 |
| WO | 2024220425 | 10/2024 |
| WO | 2024220431 | 10/2024 |
| WO | 2024220526 | 10/2024 |
| WO | WO-2024261154 A1 * | 12/2024 |

OTHER PUBLICATIONS

"International Application Serial No. PCT/US2024/012626, Written Opinion mailed Apr. 4, 2024", 5 pgs.

Walton, Nick, "Our Shift to the Walls Approach", Latitude, [Online]. Retrieved from the Internet: <https://web.archive.org/web/20210930180047/https://latitude.io/blog/the-walls-approach>, (Sep. 30, 2021), 2 pgs.

"International Application Serial No. PCT/US2024/016940, International Search Report mailed May 24, 2024", 3 pgs.

"International Application Serial No. PCT/US2024/016940, Written Opinion mailed May 24, 2024", 9 pgs.

"International Application Serial No. PCT/US2024/014450, International Search Report mailed Jun. 3, 2024", 4 pgs.

"International Application Serial No. PCT/US2024/014450, Written Opinion mailed Jun. 3, 2024", 5 pgs.

"International Application Serial No. PCT/US2024/024798, International Search Report mailed Jul. 12, 2024", 3 pgs.

"International Application Serial No. PCT/US2024/024798, Written Opinion mailed Jul. 12, 2024", 5 pgs.

"International Application Serial No. PCT/US2024/023877, International Search Report mailed Jul. 16, 2024", 5 pgs.

"International Application Serial No. PCT/US2024/023877, Written Opinion mailed Jul. 16, 2024", 6 pgs.

"International Application Serial No. PCT/US2024/024788, International Search Report mailed Jul. 16, 2024", 5 pgs.

"International Application Serial No. PCT/US2024/024788, Written Opinion mailed Jul. 16, 2024", 7 pgs.

"International Application Serial No. PCT/US2024/024100, International Search Report mailed Jul. 18, 2024", 4 pgs.

"International Application Serial No. PCT/US2024/024100, Written Opinion mailed Jul. 18, 2024", 8 pgs.

"International Application Serial No. PCT/US2024/023744, International Search Report mailed Aug. 22, 2024", 4 pgs.

"International Application Serial No. PCT/US2024/023744, Written Opinion mailed Aug. 22, 2024", 11 pgs.

"International Application Serial No. PCT/US2024/024459, International Search Report mailed Aug. 23, 2024", 5 pgs.

"International Application Serial No. PCT/US2024/024459, Written Opinion mailed Aug. 23, 2024", 7 pgs.

"International Application Serial No. PCT/US2024/024973, International Search Report mailed Sep. 3, 2024", 7 pgs.

"International Application Serial No. PCT/US2024/024973, Written Opinion mailed Sep. 3, 2024", 7 pgs.

Ivona, Tautkute, "What Looks Good with my Sofa: Multimodal Search Engine for Interior Design", arxiv.org, Cornell University Library, 201 Olin Library Cornell University Ithaca, NY 14853, (Jul. 21, 2017), 8 pgs.

Jun, Ehara, "Texture overlay for virtual clothing based on PCA of silhouettes", Mixed and Augmented Reality, 2006. ISMAR 2006. IEEE ACM International Symposium on, IEEE, PI, (Oct. 22, 2006), 139-142.

Liang, Yaoyuan, "Multi-modal Contextual Graph Neural Network for Text Visual Question Answering", 2020 25th International Conference on Pattern Recognition (ICPR), IEEE, (Jan. 10, 2021), 8 pgs.

Bastian, Matthias, "ChatARKit: ChatGPT programs AR app using natural language alone", [Online]. Retrieved from the Internet: <https://mixed-news.com/en/chatarkit-chatgpt-programs-ar-appusing-natural-language-alone/>, (Dec. 31, 2022), 6 pgs.

ZAUBAR, "ZAUBAR Magic: AI-powered content creation tool for the metaverse by ZAUBAR", [Online]. Retrieved from the Internet: <https://www.youtube.com/watch?v=zpa30DWUyco>, (Apr. 6, 2023), 2 pgs.

(56) References Cited

OTHER PUBLICATIONS

"U.S. Appl. No. 18/584,852, Non Final Office Action mailed Jun. 18, 2025", 23 pgs.

"U.S. Appl. No. 18/584,852, Examiner Interview Summary mailed Jul. 23, 2025", 2 pgs.

"International Application Serial No. PCT/US2024/016940, International Preliminary Report on Patentability mailed Sep. 4, 2025", 11 pgs.

"U.S. Appl. No. 18/584,852, Response filed Sep. 18, 2025 to Non Final Office Action mailed Jun. 18, 2025", 9 pgs.

"U.S. Appl. No. 18/584,852, Notice of Allowance mailed Jan. 23, 2026", 9 pgs.

"U.S. Appl. No. 18/584,852, Corrected Notice of Allowability mailed Feb. 4, 2026", 2 pgs.

* cited by examiner 104                      124                                        100

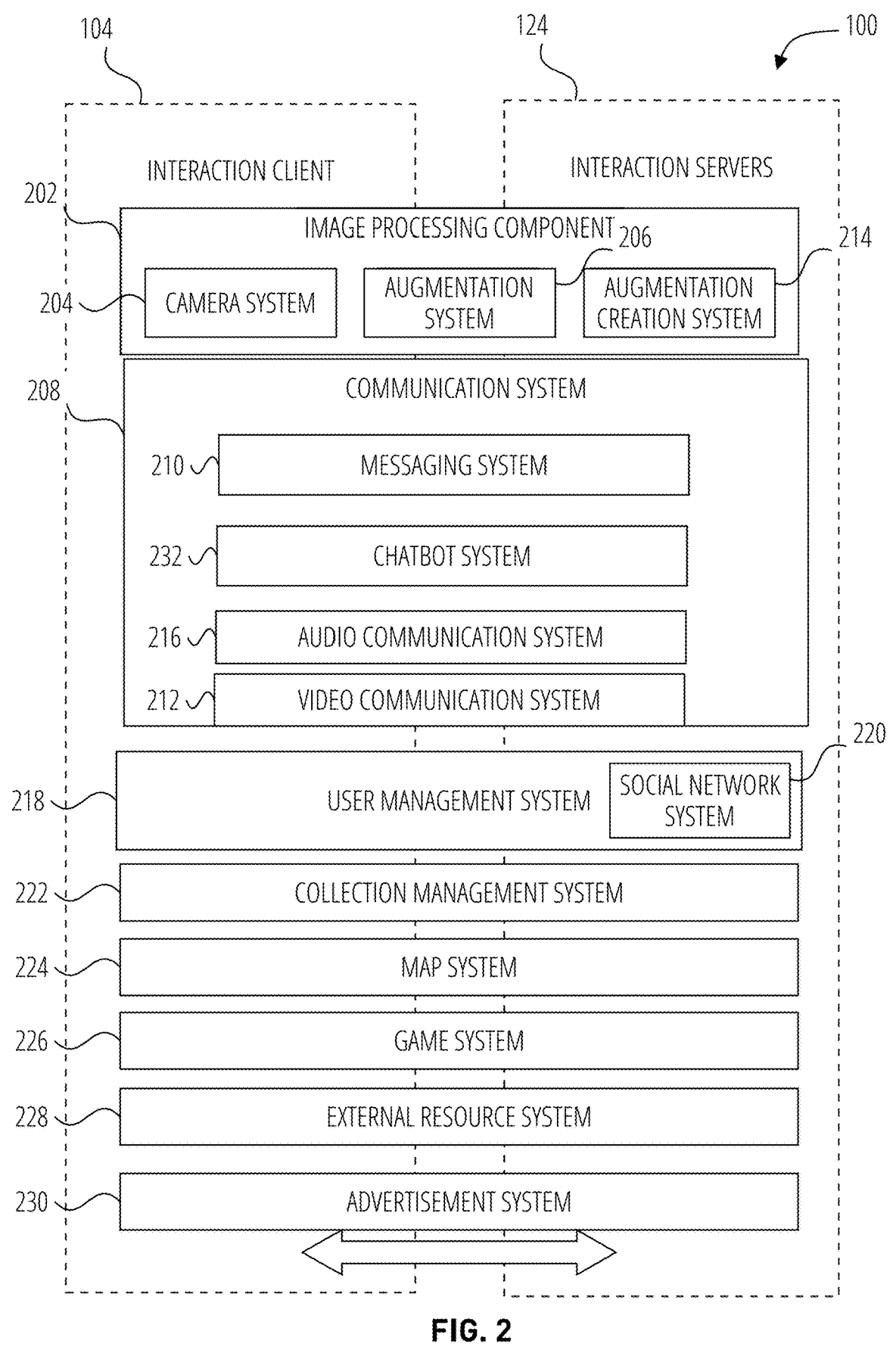

INTERACTION CLIENT                    INTERACTION SERVERS

202

IMAGE PROCESSING COMPONENT 206                        214

204    CAMERA SYSTEM    AUGMENTATION SYSTEM    AUGMENTATION CREATION SYSTEM

208    COMMUNICATION SYSTEM

210    MESSAGING SYSTEM

232    CHATBOT SYSTEM

216    AUDIO COMMUNICATION SYSTEM

212    VIDEO COMMUNICATION SYSTEM

220

218    USER MANAGEMENT SYSTEM    SOCIAL NETWORK SYSTEM

222    COLLECTION MANAGEMENT SYSTEM

224    MAP SYSTEM

226    GAME SYSTEM

228    EXTERNAL RESOURCE SYSTEM

230    ADVERTISEMENT SYSTEM

FIG. 2

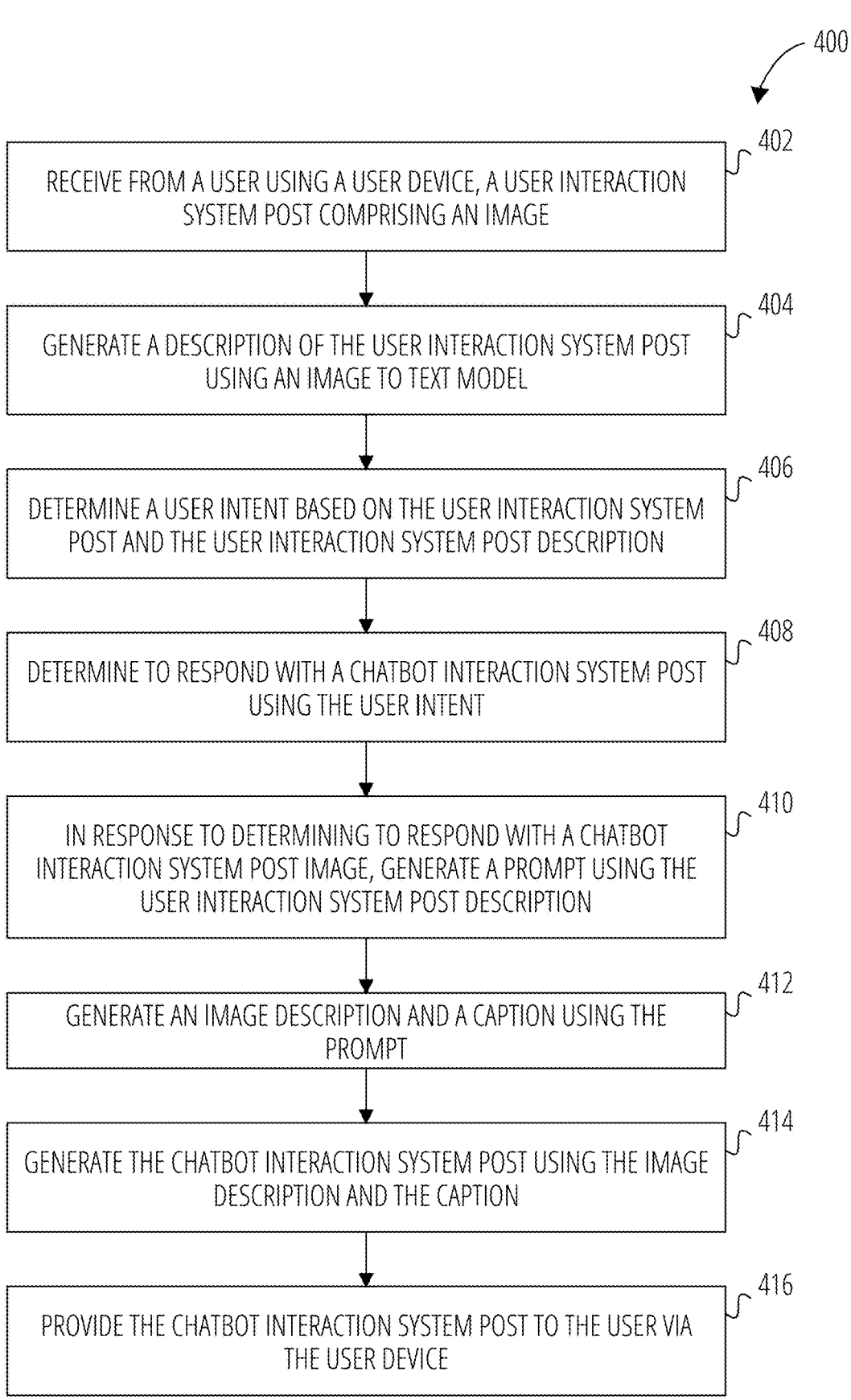

400

RECEIVE FROM A USER USING A USER DEVICE, A USER INTERACTION SYSTEM POST COMPRISING AN IMAGE

402

GENERATE A DESCRIPTION OF THE USER INTERACTION SYSTEM POST USING AN IMAGE TO TEXT MODEL

404

DETERMINE A USER INTENT BASED ON THE USER INTERACTION SYSTEM POST AND THE USER INTERACTION SYSTEM POST DESCRIPTION

406

DETERMINE TO RESPOND WITH A CHATBOT INTERACTION SYSTEM POST USING THE USER INTENT

408

IN RESPONSE TO DETERMINING TO RESPOND WITH A CHATBOT INTERACTION SYSTEM POST IMAGE, GENERATE A PROMPT USING THE USER INTERACTION SYSTEM POST DESCRIPTION

410

GENERATE AN IMAGE DESCRIPTION AND A CAPTION USING THE PROMPT

412

GENERATE THE CHATBOT INTERACTION SYSTEM POST USING THE IMAGE DESCRIPTION AND THE CAPTION

414

PROVIDE THE CHATBOT INTERACTION SYSTEM POST TO THE USER VIA THE USER DEVICE

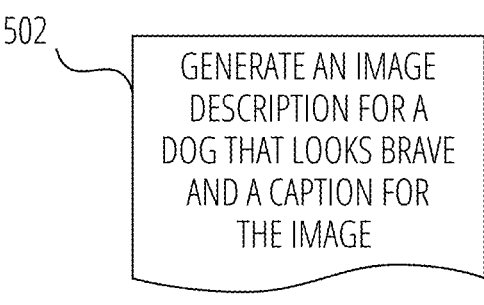

GENERATE AN IMAGE
DESCRIPTION FOR A
DOG THAT LOOKS BRAVE
AND A CAPTION FOR
THE IMAGE

FIG. 5A

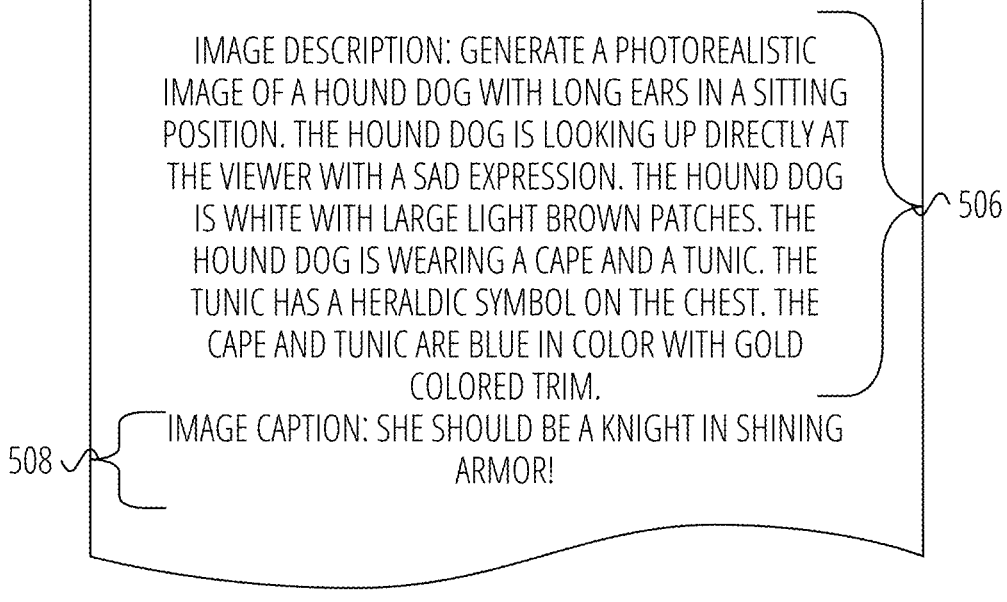

IMAGE DESCRIPTION: GENERATE A PHOTOREALISTIC
IMAGE OF A HOUND DOG WITH LONG EARS IN A SITTING
POSITION. THE HOUND DOG IS LOOKING UP DIRECTLY AT
THE VIEWER WITH A SAD EXPRESSION. THE HOUND DOG
IS WHITE WITH LARGE LIGHT BROWN PATCHES. THE
HOUND DOG IS WEARING A CAPE AND A TUNIC. THE
TUNIC HAS A HERALDIC SYMBOL ON THE CHEST. THE
CAPE AND TUNIC ARE BLUE IN COLOR WITH GOLD
COLORED TRIM.

IMAGE CAPTION: SHE SHOULD BE A KNIGHT IN SHINING
ARMOR!

702
DATA COLLECTION AND PREPROCESSING

704
FEATURE ENGINEERING

706
MODEL SELECTION AND TRAINING

708
MODEL EVALUATION

710
PREDICTION

712
VALIDATION, REFINEMENT OR RETRAINING

714
DEPLOYMENT

CHATBOT RESPONSE SYSTEM

TECHNICAL FIELD

The present disclosure relates generally to interaction systems and more particularly to providing interaction interfaces to users of an interaction system.

BACKGROUND

Users access interaction systems to interact with chatbots in conversations. In some chatbot conversations, a user may wish to exchange posts containing images with a chatbot.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a diagrammatic representation of a messaging system, according to some examples, that has both client-side and server-side functionality.

FIG. 4A illustrates a chatbot response method, according to some examples.

FIG. 5A illustrates a prompt for a text generative model, according to some examples.

FIG. 5B illustrates an image description and a caption, according to some examples.

DETAILED DESCRIPTION

Figure 1:
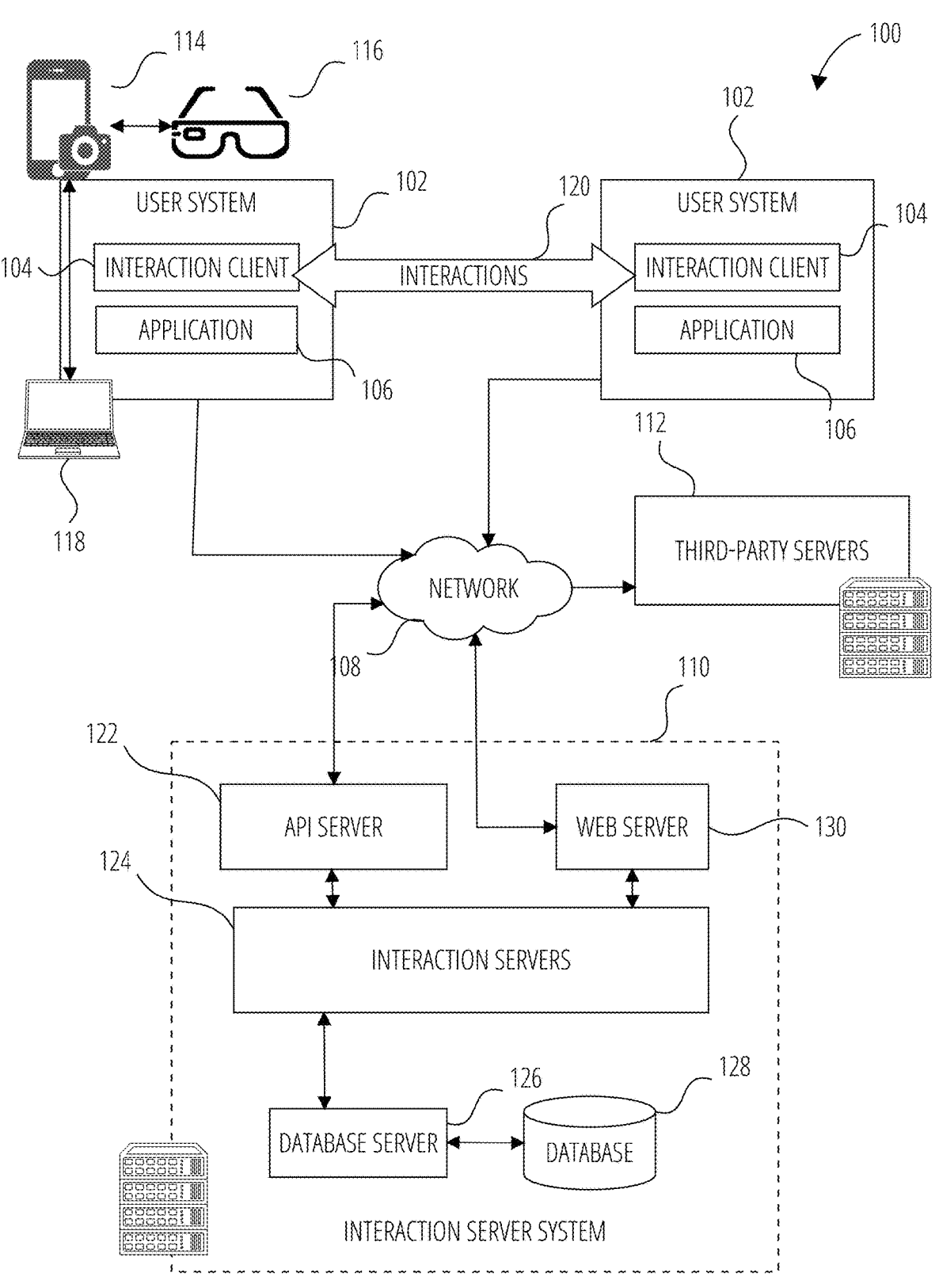
FIG. 1 is a diagrammatic representation of a networked environment in which the present disclosure may be deployed, according to some examples.

Interaction systems (e.g., social platforms, social media platforms, interactive platforms, extended reality platforms, messaging platforms, systems with which a user interacts, and the like) may provide ways for users to perform various functions, access information, and access entertainment. For example, some users may want the ability to easily connect with friends, family, and other personal connections using social media facilitates to stay in touch by sharing life updates through posts and messaging. Some users may want to discover new content and people based on interests and use an interaction system to follow accounts, influencers, groups, and more to be entertained and stay informed. Businesses and organizations additionally use interaction systems to promote brands, market products, and share their stories. Users may also use interaction systems to join communities of like-minded individuals united by hobbies, identities, causes, and other shared interests. Some users may want to use interaction systems to express creativity through different formats like blogs, videos, and photos.

For some users, interaction with an interaction system may be enhanced by interacting with a chatbot system designed to simulate human conversation through voice commands or text chats. A chatbot system may employ Natural Language Processing (NLP) and Machine Learning (ML)/artificial intelligence methodologies to understand and interpret a user's input and generate a response. A chatbot system can serve multiple uses during a conversation including providing useful information to a user and providing entertaining responses to interaction system posts made by the user.

Methodologies described herein provide an enhanced, personalized user experience with chatbots and other conversational systems. In some examples, a chatbot system responds to user posts comprising images with posts comprising images on an interaction system. The chatbot system leverages a large language model to support conversations on various topics and extend its capabilities to properly reply to image posts.

In some examples, a chatbot system implements a pipeline to process user-submitted image posts, extract image descriptions using machine learning models, check for policy violations, determine user intent, and construct appropriate image or text responses. The chatbot system orchestrates the flow of images and data through different internal services to generate image descriptions, captions, and new synthetic images as needed.

In some examples, a chatbot system relies on an internal service to handle image processing operations, freeing the chatbot system from directly conducting costly image manipulation tasks. This service can run various models in parallel to extract information from images, detect any policy violations, and provide additional functionality such as image classifications.

In some examples, a chatbot system classifies user intent based on analyzed image content and descriptions and directs images through appropriate response generation pipelines. Unique image descriptions and captions are generated based on the inferred intent before being passed to generative models to create new synthetic images.

In some examples, a chatbot system blocks any inappropriate or harmful content based on configured violation thresholds. Any images exceeding thresholds of inappropriate content are prevented from proceeding further in the pipeline. In some examples, the system provides a text response that the post cannot be processed. This mitigates risks associated with generating harmful responses.

In some examples, a chatbot system receives an image post from a user's client device. The chatbot system generates a description of the post using an image-to-text model and determines a user intent based on the post and description. The chatbot system decides to respond with an image post based on the user intent. The chatbot system generates a prompt using the post description, and generates an image description and caption using the prompt. The chatbot system creates the image post using the image description and caption, and provides the image post to the user's client device.

In some examples, a chatbot system generates the prompt by appending style instructions to the post description. The style instructions include generating the image in an interactive platform post style.

In some examples, a chatbot system generates an inappropriate content score for the user's post using the post and a sanitation model. If the inappropriate content score exceeds a threshold, the chatbot system provides a text response indicating the post cannot be processed.

In some examples, a chatbot system detects that an inappropriate content score for a user's post exceeds a threshold value, and modifies the post's description to remove inappropriate content.

In some examples, a chatbot system randomly determines whether to respond with a text response or an image post.

Other technical features may be readily apparent to one skilled in the art from the following figures, descriptions, and claims.

Networked Computing Environment

FIG. 1 is a block diagram showing an example interaction system 100 of an interaction system for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Application Programming Interfaces (APIs).

Each user system 102 may include multiple user devices, such as a mobile user device 114, head-wearable user device 116, and a computer user device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, user device information, geolocation information, media augmentation and overlays, message content persistence conditions, interaction system information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, using a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below.

An image processing component 202 provides various functions that enable a user to capture and augment (e.g., augment or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of a user system 102. These augmentations are selected by the augmentation system 206 and presented to a user of an interaction client 104, using a number of inputs and data, such as, but not limited to, geolocation of the user system 102, and interaction system information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing component 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing component 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing component 202 provides a user-based publication platform that enables users to select a geolocation on a map and upload content associated with the selected geolocation. The user may also specify circumstances under which a particular media overlay should be offered to other users. The image processing component 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, a chatbot system 232, an audio communication system 216, and a video communication system 212. The messaging system 210 is responsible for enforcing the temporary or time-limited access to content by the interaction clients 104. The messaging system 210 incorporates multiple timers within an ephemeral timer system (not shown) that, using duration and display parameters associated with a message or collection of messages (e.g., a story), selectively enable access (e.g., for presentation and display) to messages and associated content via the interaction client 104. Further details regarding the operation of the ephemeral timer system are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104. The chatbot system 232 is responsible for generating responses to interaction system posts received from a user and communicating a response to the interaction system posts.

A user management system 218 is operationally responsible for the management of user data and profiles, and includes an interaction system 220 that maintains interaction system information regarding relationships between users of the interaction system 100.

A collection management system 222 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 222 may also be responsible for publishing an icon that provides notification of a particular collection to the user interface of the interaction client 104. The collection management system 222 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 222 employs machine vision (or image recognition technology) and content rules to curate a content collection automatically. In certain examples, compensation may be paid to a user to include user-generated content into a collection. In such cases, the collection management system 222 operates to automatically make payments to such users to use their content.

A map system 224 provides various geographic location functions and supports the presentation of map-based media content and messages by the interaction client 104. For example, the map system 224 enables the display of user icons or avatars (e.g., stored in profile data 902) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 226 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 228 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 230 operationally enables the purchasing of advertisements by third parties for presentation to end-users via the interaction clients 104 and also handles the delivery and presentation of these advertisements.

Figure 3:
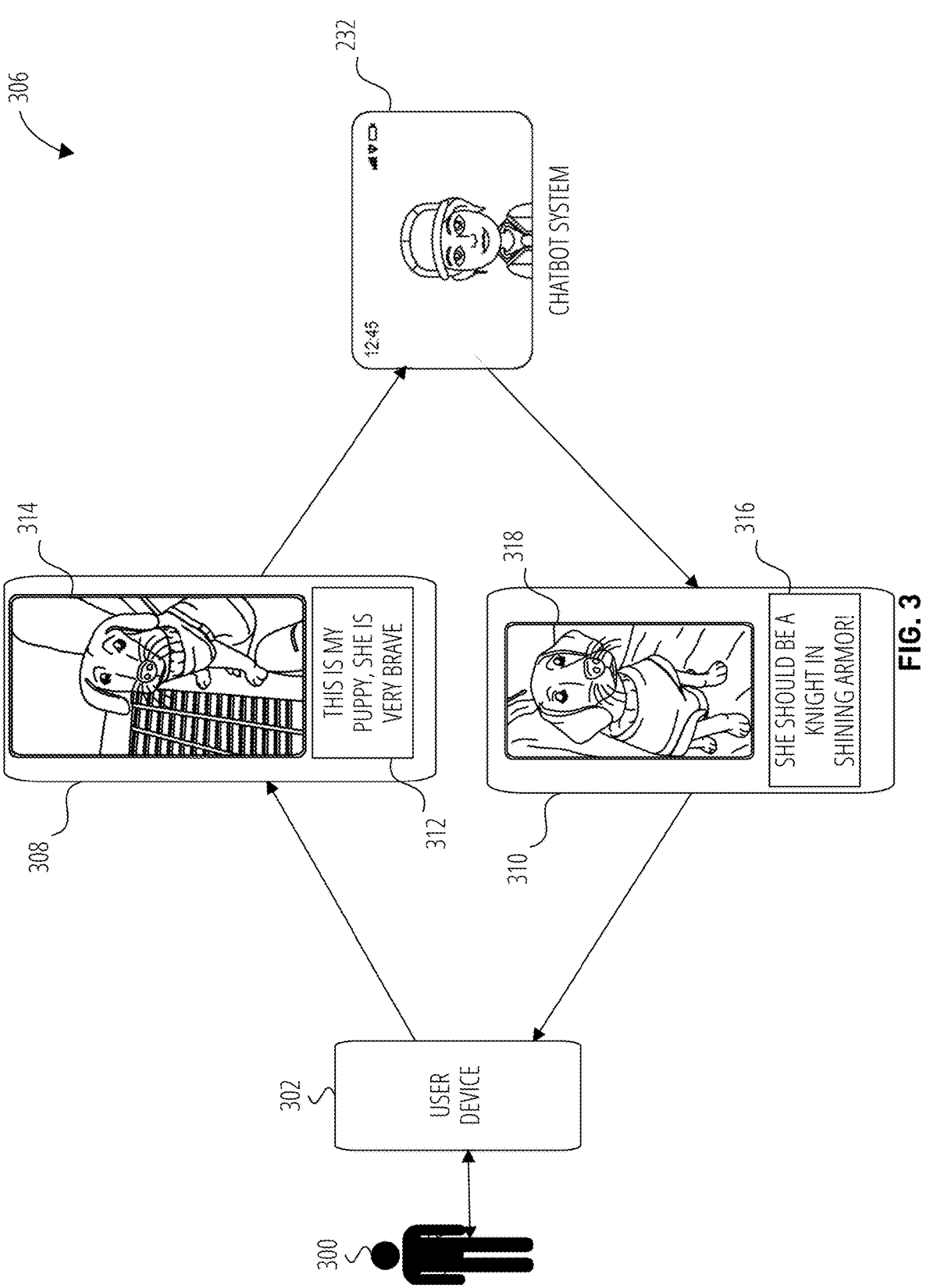
FIG. 3 is an illustration an interaction session by a user with a chatbot system, in accordance with some examples.

FIG. 3 is an illustration of an interaction session 306 between a user 300 and a chatbot system 232, in accordance with some examples. In the interaction session 306, the user 300 uses a user device 302 to communicate a user interaction system post 308 to the chatbot system 232 as part of a conversation as more fully described in reference to FIG. 4A and FIG. 4B. The user interaction system post 308 includes an image 314 that is part of a user story or sequence of interaction system postings. In some examples, user interaction system post 308 further comprises a caption 312 providing a comment on the image 314. The chatbot system 232 receives the user interaction system post 308 and generates a chatbot interaction system post 310 in response as more fully described in reference to FIG. 4A and FIG. 4B. The chatbot interaction system post 310 comprises an image 318 generated by the chatbot system 232 and a caption 316 commenting on the image 318. The chatbot system 232 communicates the chatbot interaction system post 310 to the user device 302 and the user device 302 provides the chatbot interaction system post 310 to the user 300.

Figure 4B:
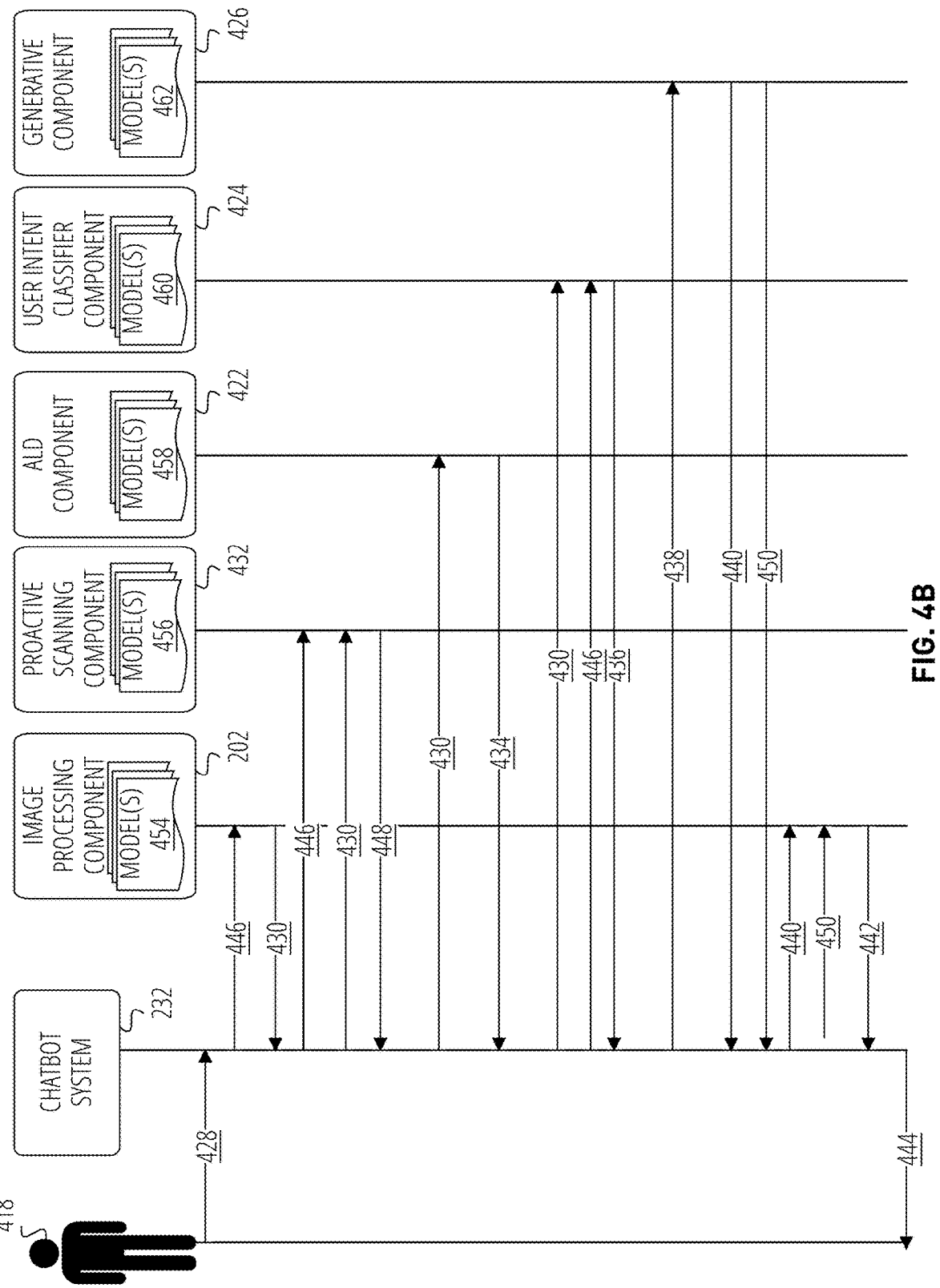
FIG. 4B illustrates a sequence of operations of a chatbot response method, according to some examples.

FIG. 4A is a process flow diagram of a chatbot response method 400 and FIG. 4B is a sequence diagram of the chatbot response method 400, according to some examples. A chatbot system 232 of an interaction system uses the chatbot response method 400 to respond to a user interaction system post 428 comprising an image that is received from a user 418. Although the example chatbot response method 400 depicts a particular sequence of operations, the sequence may be altered without departing from the scope of the present disclosure. For example, some of the operations depicted may be performed in parallel or in a different sequence that does not materially affect the function of the chatbot response method 400. In other examples, different components of an interaction system or system that implements the chatbot response method 400 may perform functions at substantially the same time or in a specific sequence.

In operation 402, the chatbot system receives, from a user 418 using a user device, a user interaction system post 428 comprising an image. For example, the chatbot system 232 receives a user interaction system post 428 containing an image that the user 418 sends via an interaction application on a user device of the user such as, but not limited to, a mobile user device 114, computer user device 118, head-wearable user device 116 (all of FIG. 1), or the like. In some examples, the user 418 sends a user interaction system post 428 from their user device to the chatbot system 232 via a messaging system, such as messaging system 210 (of FIG. 2), of the interaction system 100 hosting the chatbot system 232.

In some examples, before transmitting the user interaction system post 428, the user device encrypts the image of the user interaction system post 428 and uploads the encrypted image to a cloud storage system. The user device calls the messaging system of the interaction system 100 and sends the user interaction system post 428 message containing an encryption key and an initialization vector along with the uploaded image. The messaging system receives the user interaction system post 428 stores the interaction system post message and forwards a message envelope containing the image and encryption details to the chatbot system 232.

In operation 404, the chatbot system 232 generates an image description 430 of the image 446 user interaction system post using an image-to-text model. For example, the chatbot system 232 utilizes an image processing component 202 of the interaction system 100 to analyze the image 446 included in the user interaction system post 428. The image processing component 202 uses Artificial Intelligence (AI) methodologies and one or more image processing models 454 to analyze images of user interaction system posts 428 received by the chatbot system 232 from the user 418 and generate images for inclusion in chatbot interaction system posts 444 communicated from the chatbot system 232 to the user 418.

Figure 7A:
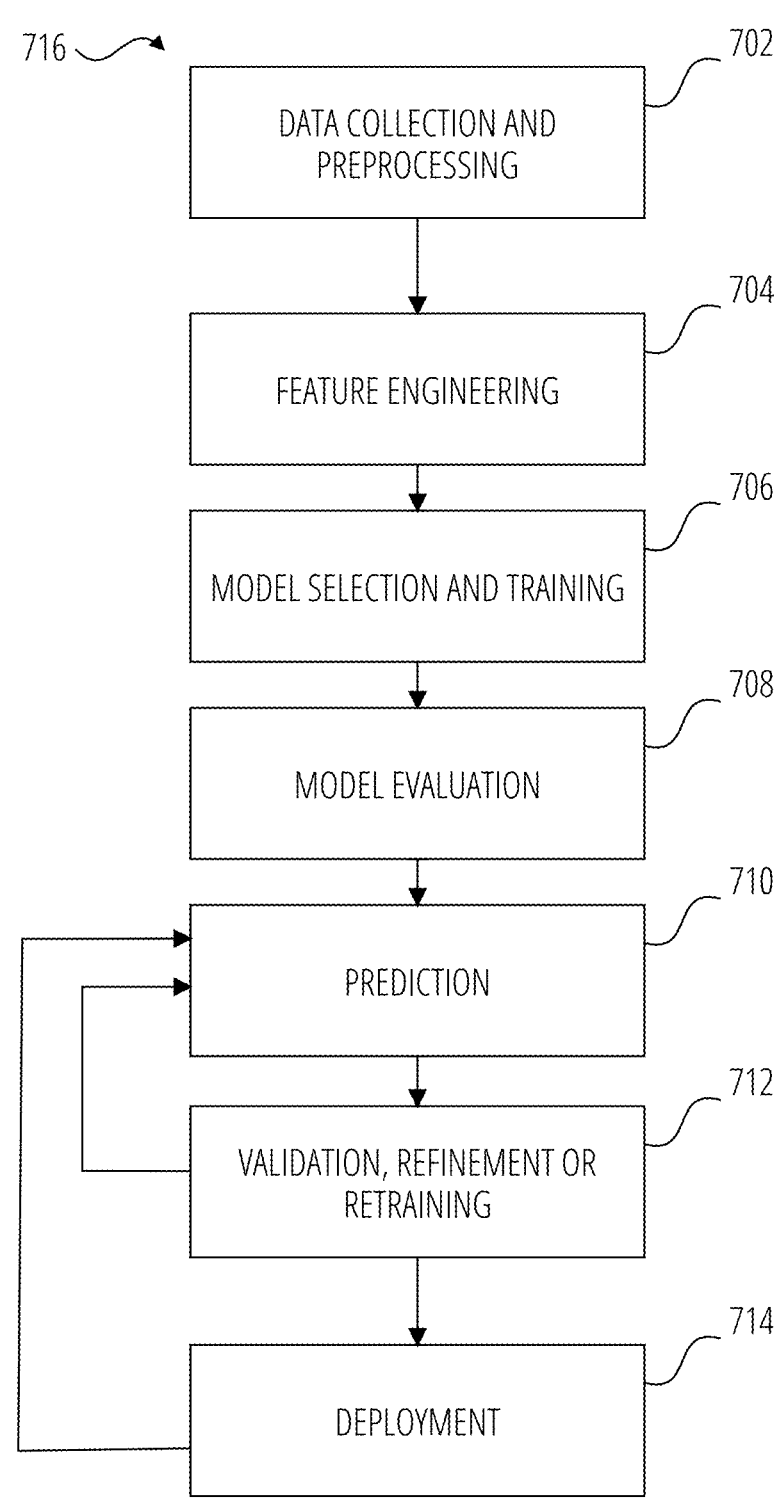
FIG. 7A illustrates a machine-learning pipeline, according to some examples.
Figure 7B:
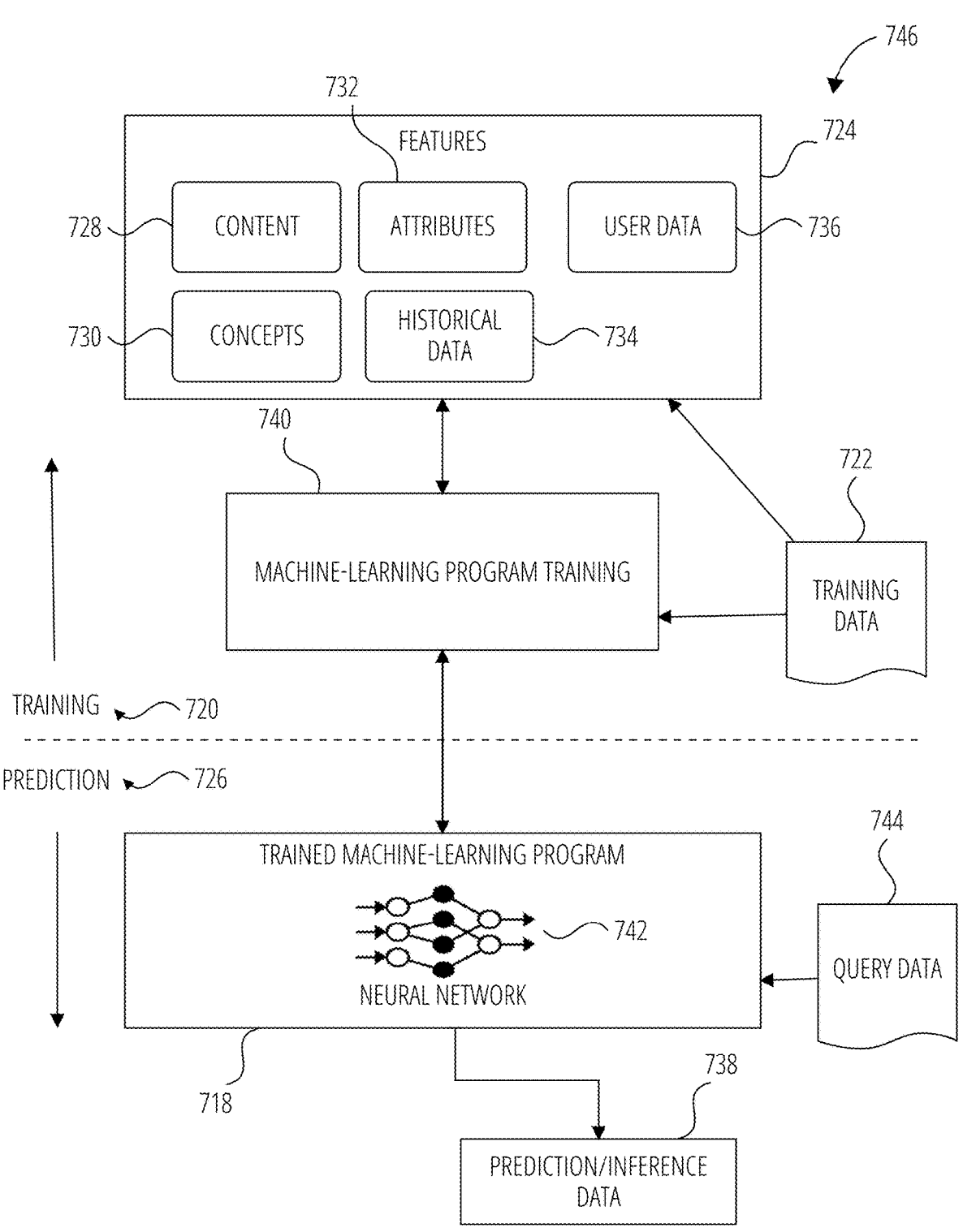
FIG. 7B illustrates training and use of a machine-learning program, according to some examples.

The image processing component 202 receives the image 446 of the user interaction system post 428 and passes the image through an image-to-text model of the models 454 trained to analyze image content and output text descriptions as more fully described in reference to FIG. 7A and FIG. 7B. The image-to-text model detects objects, people, actions, scenes, and other visual features present in the image 446. The image-to-text model extracts visual concepts and semantics from the image 446.

In some examples, the image-to-text model is trained on large datasets of images labeled with textual captions and descriptions. This allows the image-to-text model to learn associations between visual patterns/features in images and corresponding textual descriptions. The image-to-text model applies this learning to generate a textual image description 430 summarizing the contents of the image 446 from the user interaction system post 428. The image description 430 is a textual summary reflecting the objects, people, actions, and scene captured in the image 446. The final textual image description 430 generated by the image processing component 202 provides a concise description of what the input image 446 depicts.

In some examples, the chatbot system 232 communicates the image 446 and the image description 430 to a proactive scanning component 432. The proactive scanning component 432 uses AI methodologies and one or more scanning models 456 trained to scan images and scan text descriptions of images to find inappropriate content in the images. Training and composition of the models 456 are more fully described in reference to FIG. 7A and FIG. 7B. The proactive scanning component 432 receives the image 446 and the image description 430 and performs a proactive scan of the image 446 and analysis of the image description 430 and generates an inappropriate content score 448 for the image 446 as more fully described in reference to FIG. 6.

In some examples, the chatbot system 232 communicates the image description 430 to an Abusive Language Detection (ALD) component 422. The ALD component 422 uses AI methodologies and one or more ALD models 458 trained to recognize abusive language that is prohibited by an operator of the interaction system 100 hosting the chatbot system 232. Training and composition of the one or more models 458 are more fully described in reference to FIG. 7A and FIG. 7B. The ALD component 422 receives the image description 430 and performs an analysis of the image description 430 and generates a prohibited language score 434 indicating a probability that the image description 430 contains prohibited language. For example, the ALD component 422 processes the text through natural language processing algorithms to extract linguistic features that are indicative of abusive, offensive, or inappropriate language. This may include features like profanity, threats, insults, hate speech, and explicit language. The extracted features are compared to known patterns and classifiers for abusive language that the ALD component 422 has been trained on. These patterns and classifiers allow the ALD component 422 to recognize abusive language within the textual description. The ALD component 422 assigns a prohibited language score 434 indicating the presence and severity of abusive language found in the text. If the prohibited language score 434 exceeds a defined threshold, the image description 430 is flagged as containing inappropriate language. The ALD component 422 automatically scans the image description 430 and detects abusive language using one or more ALD models trained specifically for this purpose. This allows inappropriate image content to be identified from the image description 430 alone.

In some examples, if the inappropriate content score exceeds a threshold, the chatbot system responds by providing a text response to the user 418 indicating the user interaction system post 428 cannot be processed.

In some examples, when the chatbot system 232 detects that an inappropriate content score for a user interaction system post 428 exceeds a threshold value, the chatbot system 232 modifies a description of the user interaction system post 428 to remove inappropriate content.

In operation 406, the chatbot system 232 determines a user intent 436 based on the user image description 430. For example, the chatbot system 232 communicates the image description 430 and the image 446 to a user intent classifier component 424. The user intent classifier component 424 uses AI methodologies and one or more classifier models 460 trained to recognize a user intent 436 in an image 446 and an image description 430. Training and composition of the one or more models 460 are more fully described in reference to FIG. 7A and FIG. 7B. The user intent classifier component 424 receives the image description 430 and generates a user intent 436 using the image description 430 and one or more user intent models. For example, the user intent classifier component 424 processes the text of the image description 430 using natural language processing techniques to extract semantic features that provide signals as to the intent of the user 418. The user intent classifier component 424 compares these extracted features to an inventory of known user intent patterns that the user intent classifier component 424 has been trained on. For example, intents related to pets, food, fashion, and more. Using machine learning models, the user intent classifier component 424 analyzes the image description 430 and classifies the text into one or more of the predefined user intent categories based on pattern matching. The user intent classifier component 424 assigns confidence scores for each identified user intent 436. If the score for a particular intent exceeds a threshold, that intent is considered detected in the image description 430. Accordingly, the user intent classifier component 424 is able to automatically deduce a user's likely user intent 436 from the image description 430 text using its trained machine learning models. The chatbot system 232 uses the identified user intent 436 to drive downstream processes.

In some examples, the chatbot system 232 employs computer vision techniques on the image 446 content itself to determine objects, scenes, activities depicted that indicate the user intent. For example, the user intent classifier component 424 analyzes the visual contents of the image 446 using computer vision techniques to identify objects, faces, actions, and other semantic content depicted. The user intent classifier component 424 extracts visual features from the image 446 that are indicative of certain user intents it has been trained to recognize. For example, features suggestive of intents such as, but not limited to pets, food, fashion, and the like. The user intent classifier component 424 communicates the extracted visual features to a machine learning model to classify the image 446 into one or more predefined user intent categories. The machine learning model compares the image 446 features to learned patterns and correlations between visual cues and user intents built from training data. The user intent classifier component 424 assigns confidence scores to each identified user intent. If a score exceeds a threshold, that user intent is considered detected from the submitted image 446. By processing the image 446 using artificial intelligence methodologies, the user intent classifier component 424 is able to infer a user's likely intent automatically and without need for textual description.

In operation 408, the chatbot system 232 determines to respond to the user interaction system post 428 with a chatbot interaction system post 444 using the user intent 436. For example, based on the inferred user intent 436 from the image 446 in the user interaction system post 428, the chatbot system 232 decides whether to respond back with a chatbot interaction system post 444 comprising an image or a chatbot interaction system post 444 comprising text.

In some examples, the chatbot system employs rules-based logic or machine learning models to make the determination using the user intent 436. The chatbot system 232 performs intent classification and assigns confidence scores for each intent. The chatbot system 232 compares the confidence scores against predetermined thresholds to decide on responding back with a chatbot interaction system post 444 comprising an image or a text message.

In some examples, the chatbot system 232 performs randomization when confidence scores are similar to make a chatbot conversation more natural.

In some examples, the chatbot system 232 determines whether to respond with a chatbot interaction system post 444 comprising an image or a text message.

In operation 410, in response to determining to respond with a chatbot interaction system post 444, the chatbot system 232 generates a prompt (e.g., prompt 502 of FIG. 5A) used to prompt a generative component 426 to generate an image description 440 (e.g., image description 506 of FIG. 5B) and image caption 450 (e.g., image caption 508 of FIG. 5B) using the user intent 436. The prompt 438 provides context about the desired image to the generative component 426. In some examples, the prompt 438 comprises a detailed text description of the image content to be generated such as, but not limited to, objects, scenes, people, colors, textures, styles, and the like. In some examples, the prompt 438 specifies the size, resolution and level of realism needed for an image. In some examples, the prompt includes instructions about the overall tone, mood and aesthetic of the image. In some examples, the prompt 438 gives guidance on the graphic design, framing, lighting and composition. In some examples, the prompt 438 provides example images or artistic styles to emulate. In some examples, the prompt 438 may include keywords to make the image feel more human-made rather than computer generated. By receiving such details in the prompt 438, the generative component 426 can produce a customized image description 440 and image caption 450 as requested by the chatbot system 232.

For example, if the user intent 436 is related to pets, the prompt 438 may describe generating an image description 440 and an image caption 450 about an animal in a friendly, upbeat setting. Or for a food intent, the prompt 438 may describe generating an image description 440 and an image caption 450 about an appetizing meal. The chatbot system 232 incorporates the user intent 436 into the prompt 438 wording along with other details like desired text structure, length, and style to match the conversational context. The prompt 438 primes the generative component 426 to output an image description 440 and image caption 450 tailored to the user intent, conversation history, and expected tone. By providing a customized prompt 438, the chatbot system 232 can steer the generative component 426 to generate an image description 440 and image caption 450 that will lead to an image and caption that aligns with the user intent 436 and interaction goals.

In operation 412, the chatbot system 232 generates the image description 440 and the image caption 450. For example, the chatbot system 232 communicates the prompt 438 to a generative component 426. The generative component 426 uses AI methodologies and one or more text generative models 462 trained to generate an image description 440 and an image caption 450 in response to a prompt 438. Training and composition of the one or more models 462 are more fully described in reference to FIG. 7A and FIG. 7B. The generative component 426 receives the customized prompt 438 from the chatbot system 232 that provides context and instructions for generating the image description 440 and image caption 450. The generative component 426 processes the prompt 438 text using natural language processing to extract key semantic details about the desired image and caption. Using training on visual concepts, the generative component 426 constructs an image description 440 comprising attributes of a desired image that depicts objects, scenes, styles and the like suggested by the prompt 438. The generative component 426 generates the text for the image description 440 to match the prompt's 438 indicated tone, structure, and details. Additionally, the generative component 426 composes a relevant image caption 450 consistent with the image description 440 and prompt 438 context. In some examples, the generative component 426 produces the image description 440 and image caption 450 texts in an automatic end-to-end generative process guided by the provided prompt 438 wording and constraints.

In operation 412, the chatbot system 232 receives the image description 440 and the image caption 450 from the generative component 426 and communicates the image description 440 to the image processing component 202. The image processing component 202 receives the image description 440 and image caption 450 and generates a captioned image 442 that the chatbot system 232 uses to generate the chatbot interaction system post 444. For example, the image processing component 202 communicates the image description to a generative model that has been trained to synthesize images from textual descriptions as more fully described in reference to FIG. 7A and FIG. 7B.

The generative model analyzes the semantic contents of the image description 440 to understand attributes of a desired image such as, but not limited to, visual elements, scene, style, and the like, of the desired image. The image processing component 202 uses the generative model to map the text concepts to visual representations the generative model has developed a correlation for during training. The generative model generates image data of objects, lighting, poses, textures, arrangements, and other visual features suggested by the image description. In some examples, the image processing component 202 incorporates the caption into the generated image to generate a captioned image 442.

In some examples, the chatbot system 232 modifies the image description 440 and image caption 450 to remove any inappropriate content. For example, the chatbot system 232 communicates the image description 440 and the image caption 450 to the ALD component 422. The ALD component 422 receives the image description 440 and the image caption 450 and processes the image description 440 and the image caption 450 to remove any inappropriate content.

In some examples, the chatbot system 232 appends style instructions to the image description 440 to generate the captioned image 442 with details on a desired chatbot interaction system post style, quality, mood, and the like.

In some examples, the image processing component 202 uses an image-to-text model and a visual-question-answer model of the models 454 to extract additional details from the image 446. The image processing component 202 generates an image description using an image-to-text model and constructs specific follow-up questions about the image 446 using the image description. The image processing component 202 inputs the questions and image 446 into a visual-question-answer model. The visual-question-answer model analyzes the image 446 and outputs predicted answers to the questions. The image processing component 202 uses the question and answer pairs to further refine the prompt 438 used to prompt the generative component 426 when generating the image description 440 and the image caption 450. In some examples, the image processing component 202 uses the question and answer pairs to further refine the image description 440 and the image caption 450 used by the image processing component 202 when generating a captioned image 442. By using an image-to-text and visual-question-answer model, the chatbot system 232 can process additional targeted questions to gain more in-depth understanding of an image.

In operation 414, the chatbot system 232 generates the chatbot interaction system post 444 using the captioned image 442. For example, the chatbot system 232 receives the generated captioned image 442 from the image processing component 202. The chatbot system 232 packages the captioned image 442 into an interactive system post format for sending to the user 418. The chatbot system 232 adds any additional metadata or content needed to create a properly formatted interactive system post. In some examples, the chatbot system 232 integrates the captioned image 442 into an interactive post template that includes the standard interface elements and design. The chatbot system 232 finalizes the chatbot interaction system post 444 containing the captioned image 442 so that it is ready for delivery to the user.

In operation 416, the chatbot system 232 communicates the chatbot interaction system post 444 to the user 418 using the services of the interaction system 100 via the user device used by the user 418. For example, the chatbot system 232 sends the formatted chatbot interaction system post 444 using the messaging system 210 (of FIG. 2) of the interaction system 100. The messaging system 210 communicates the chatbot interaction system post 444 content, including the captioned image 442, to the user 418 via their user device interface.

Figure 6:
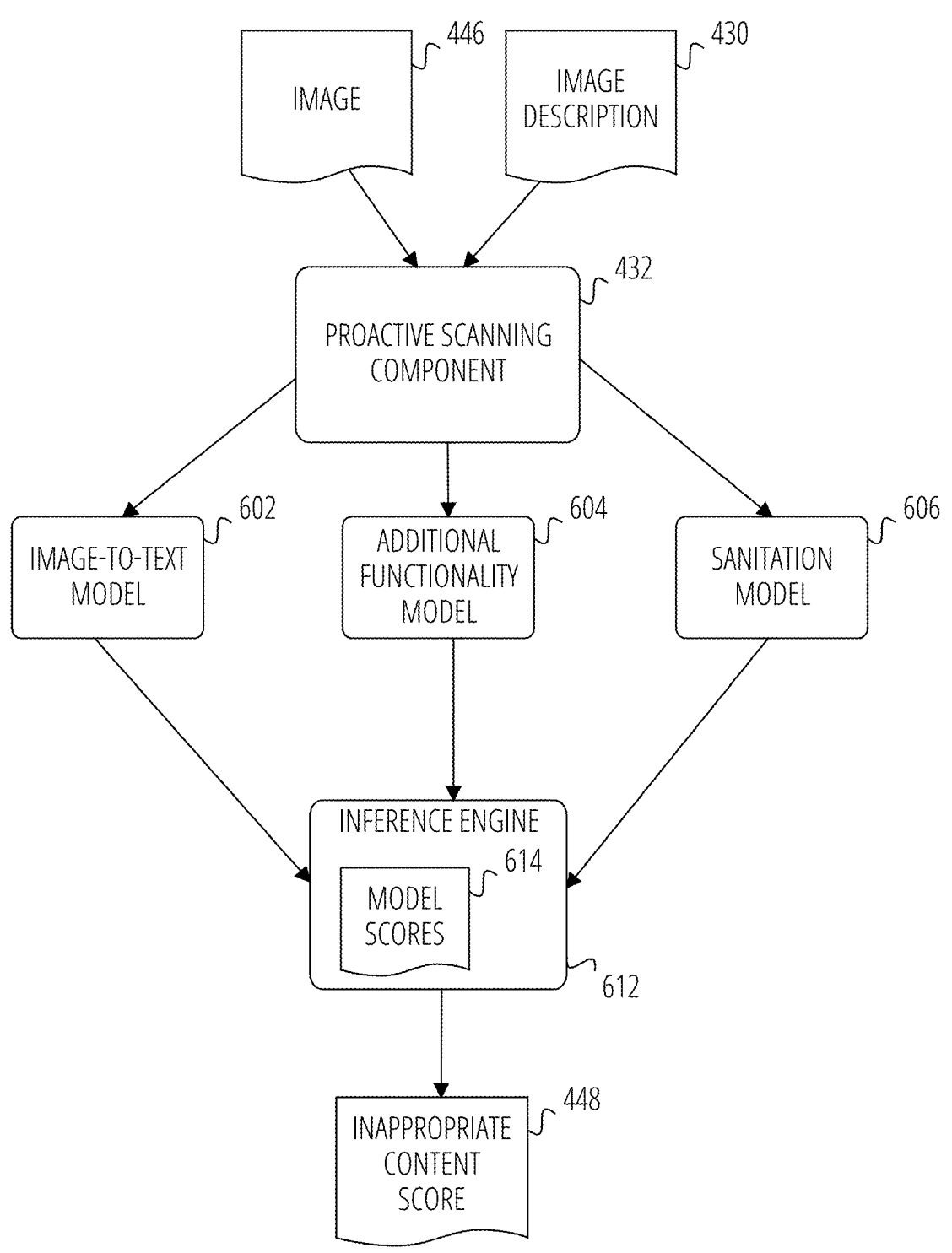
FIG. 6 illustrates a proactive scanning pipeline, according to some examples.

FIG. 6 illustrates collaboration between components of a proactive scanning component 432 (of FIG. 4B), according to some examples. A chatbot system 232 (of FIG. 4A) uses the proactive scanning component 432 to scan interaction system posts communicated by a user 418 (of FIG. 4A) to the chatbot system 232. The proactive scanning component 432 receives from the chatbot system 232 components of an interaction system post such as, but not limited to, an image 446 of the user interaction system post 428 and an image description 430 of the image 446. The proactive scanning component 432 uses one or more machine learning models such as, but not limited to an image-to-text model 602, an additional functionality model 604, and a sanitation model 606 to generate one or more model scores 614 indicating a level of inappropriate content that may be included in the image 446 and the image description 430.

In some examples, the image-to-text model 602 processes the image 446 and generates a text description of the visual contents. The image-to-text model 602 uses a natural language analysis component to extract inappropriate words, phrases, and themes found in the text description. The image-to-text model 602 calculates a score reflecting the level of profanity, sexual content, violence, or other inappropriate content in the image 446.

In some examples, the additional functionality model 604 and the sanitation model 606 extract and analyze visual details about specific inappropriate content found in the image 446. The additional functionality model 604 and the sanitation model 606 identify the types of inappropriate content present such as, but not limited to, profanity, violence, drugs, and the like. In some examples, the additional functionality model 604 and the sanitation model 606 determine the objects, contexts and interactions in the image 446 that contribute to the inappropriate content score of the image 446. In some examples, the additional functionality model 604 and the sanitation model 606 output additional descriptive information detailing the nature of the inappropriate content. By performing focused image analysis, the additional functionality model 604 and the sanitation model 606 provide more details about what type of inappropriate content is present in the image 446.

In some examples, the additional functionality model 604 and the sanitation model 606 use the image description 430 to guide an analysis of the image 446 to isolate those portions of the image 446 that may contain inappropriate content.

An inference engine 612 receives the model scores 614 from the one or more image-to-text models 602, additional functionality models 604, and sanitation models 606 and generates a combined inappropriate content score 448 indicating a level of inappropriate content found in the image 446 and 430. In some examples, a higher inappropriate content score 448 indicates more inappropriate content was detected through the image-to-text conversion and analysis.

In some examples, the image-to-text processing of the ALD component 422 is in addition to image-to-text processing performed by other components of a chatbot system. In some examples, the ALD component 422 uses image-to-text processing results generated by an image processing component of a chatbot system.

FIG. 7A is a process flow diagram depicting a machine learning and deployment process 716 and FIG. 7B is an illustration of a machine learning and deployment pipeline 746, according to some examples. The machine learning and deployment pipeline 746 may be used to generate a trained machine-learning program 718 such as, but not limited to, one or more image processing models 454, scanning models 456, ALD models 458, classifier models 460, or text generative models 462 (all of FIG. 4B) used to perform operations associated with responding to a user interaction system post by a chatbot system.

Overview

Broadly, machine learning may involve using computer algorithms to automatically learn patterns and relationships in data, potentially without the need for explicit programming. Machine learning algorithms can be divided into three main categories: supervised learning, unsupervised learning, and reinforcement learning.

> Supervised learning involves training a model using labeled data to predict an output for new, unseen inputs. Examples of supervised learning algorithms include linear regression, decision trees, and neural networks.
>
> Unsupervised learning involves training a model on unlabeled data to find hidden patterns and relationships in the data. Examples of unsupervised learning algorithms include clustering, principal component analysis, and generative models like autoencoders.
>
> Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable using one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions using the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Generating a trained machine-learning program 718 may include multiple phases that form part of the machine learning and deployment pipeline 746, including for example the following phases illustrated in FIG. 7A:

> Data collection and preprocessing 702: This phase may include acquiring and cleaning data to ensure that it is suitable for use in the machine learning model. This phase may also include removing duplicates, handling missing values, and converting data into a suitable format.
>
> Feature engineering 704: This phase may include selecting and transforming the training data 722 to create features that are useful for predicting the target variable. Feature engineering may include (1) receiving features 724 (e.g., as structured or labeled data in supervised learning) and/or (2) identifying features 724 (e.g., unstructured or unlabeled data for unsupervised learning) in training data 722.
>
> Model selection and training 706: This phase may include selecting an appropriate machine learning algorithm and training it on the preprocessed data. This phase may further involve splitting the data into training and testing sets, using cross-validation to evaluate the model, and tuning hyperparameters to improve performance.
>
> Model evaluation 708: This phase may include evaluating the performance of a trained model (e.g., the trained machine-learning program 718) on a separate testing dataset. This phase can help determine if the model is overfitting or underfitting and determine whether the model is suitable for deployment.
>
> Prediction 710: This phase involves using a trained model (e.g., trained machine-learning program 718) to generate predictions on new, unseen data.
>
> Validation, refinement or retraining 712: This phase may include updating a model using feedback generated from the prediction phase, such as new data or user feedback.
>
> Deployment 714: This phase may include integrating the trained model (e.g., the trained machine-learning program 718) into a more extensive system or application, such as a web service, mobile app, or IoT device. This phase can involve setting up APIs, building a user interface, and ensuring that the model is scalable and can handle large volumes of data.

FIG. 7B illustrates further details of two example phases, namely a training phase 720 (e.g., part of the model selection and trainings 706) and a prediction phase 726 (part of prediction 710). Prior to the training phase 720, feature engineering 704 is used to identify features 724. This may include identifying informative, discriminating, and independent features for effectively operating the trained machine-learning program 718 in pattern recognition, classification, and regression. In some examples, the training data 722 includes labeled data, known for pre-identified features 724 and one or more outcomes. Each of the features 724 may be a variable or attribute, such as an individual measurable property of a process, article, system, or phenomenon represented by a data set (e.g., the training data 722). Features 724 may also be of different types, such as numeric features, strings, and graphs, and may include one or more of content 728, concepts 730, attributes 732, historical data 734, and/or user data 736, merely for example.

In training phase 720, the machine learning and deployment pipeline 746 uses the training data 722 to find correlations among the features 724 that affect a predicted outcome or prediction/inference data 738.

With the training data 722 and the identified features 724, the trained machine-learning program 718 is trained during the training phase 720 during machine-learning program training 740. The machine-learning program training 740 appraises values of the features 724 as they correlate to the training data 722. The result of the training is the trained machine-learning program 718 (e.g., a trained or learned model).

Further, the training phase 720 may involve machine learning, in which the training data 722 is structured (e.g., labeled during preprocessing operations). The trained machine-learning program 718 implements a neural network 742 capable of performing, for example, classification and clustering operations. In other examples, the training phase 720 may involve deep learning, in which the training data 722 is unstructured, and the trained machine-learning program 718 implements a deep neural network 742 that can perform both feature extraction and classification/clustering operations.

In some examples, a neural network 742 may be generated during the training phase 720, and implemented within the trained machine-learning program 718. The neural network 742 includes a hierarchical (e.g., layered) organization of neurons, with each layer consisting of multiple neurons or nodes. Neurons in the input layer receive the input data, while neurons in the output layer produce the final output of the network. Between the input and output layers, there may be one or more hidden layers, each consisting of multiple neurons.

Each neuron in the neural network 742 operationally computes a function, such as an activation function, which takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 742 may also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 720, a validation phase may be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the model may be tested on a new dataset. The testing dataset is used to evaluate the model's performance and ensure that the model has not overfitted the training data.

In prediction phase 726, the trained machine-learning program 718 uses the features 724 for analyzing query data 744 to generate inferences, outcomes, or predictions, as examples of a prediction/inference data 738. For example, during prediction phase 726, the trained machine-learning program 718 generates an output. Query data 744 is provided as an input to the trained machine-learning program 718, and the trained machine-learning program 718 generates the prediction/inference data 738 as output, responsive to receipt of the query data 744.

In some examples, the trained machine-learning program 718 may be a generative AI model. Generative AI is a term that may refer to any type of artificial intelligence that can create new content from training data 722. For example, generative AI can produce text, images, video, audio, code, or synthetic data similar to the original data but not identical.

Some of the techniques that may be used in generative AI are:

Convolutional Neural Networks (CNNs): CNNs may be used for image recognition and computer vision tasks. CNNs may, for example, be designed to extract features from images by using filters or kernels that scan the input image and highlight important patterns.

Recurrent Neural Networks (RNNs): RNNs may be used for processing sequential data, such as speech, text, and time series data, for example. RNNs employ feedback loops that allow them to capture temporal dependencies and remember past inputs.

Generative adversarial networks (GANs): GNNs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data using these relationships. Transformer models can handle sequential data, such as text or speech, as well as non-sequential data, such as images or code.

In generative AI examples, the output prediction/inference data 738 include predictions, translations, summaries or media content.

Figure 8:
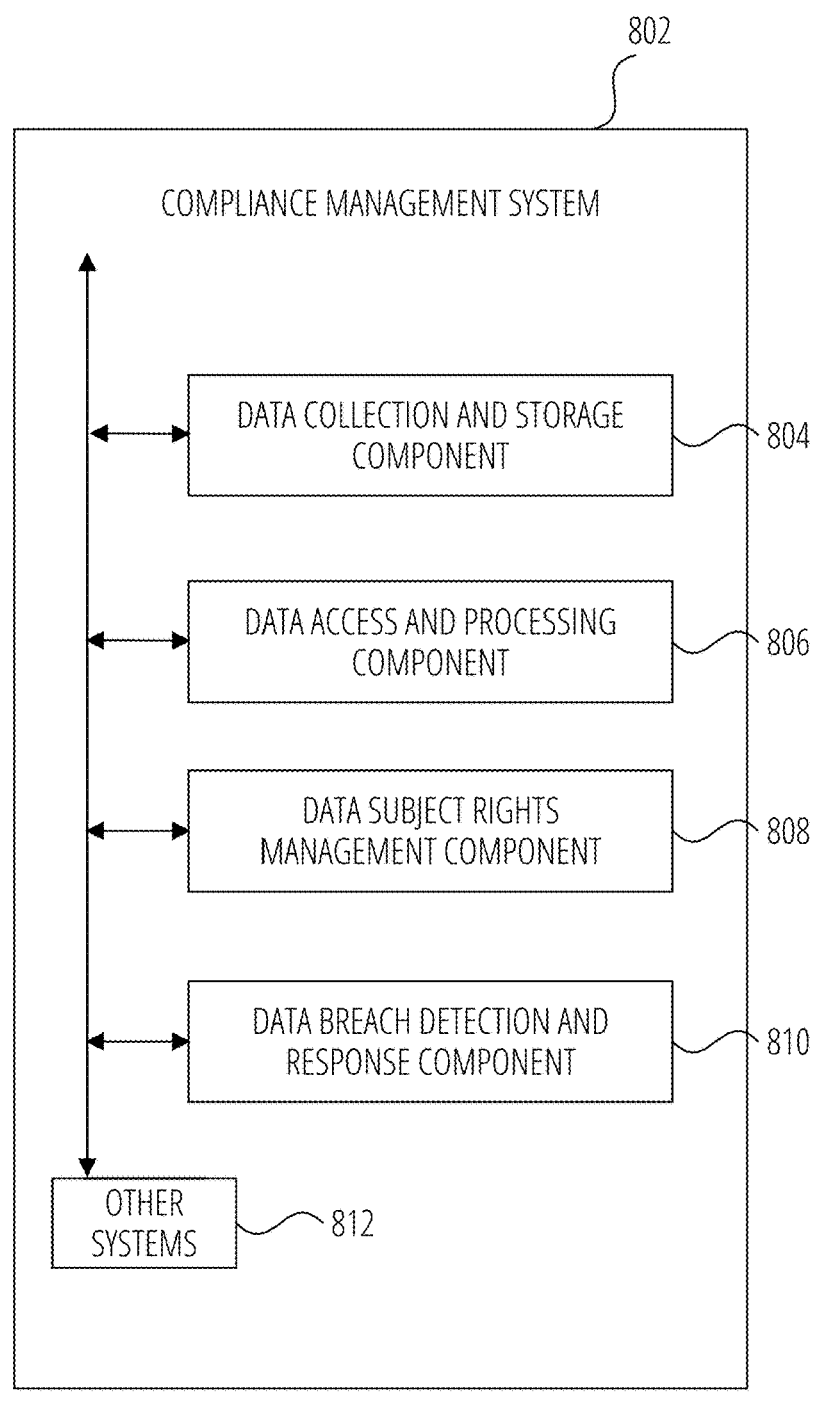
FIG. 8 illustrates a compliance system, according to some examples.

FIG. 8 is a block diagram illustrating an automated compliance management system 802, according to some examples, which may be deployed as part of a broader platform hosting a chatbot system to facilitate compliance with various data privacy and other legislative requirements, such as those of the General Data Protection Regulation (GDPR), Digital Services Act (DSA), California Consumer Privacy Act (CCPA), and other global privacy requirements. The compliance management system 802 operates with other systems 812 of a platform to implement user privacy and data protections and provide an environment in which an online platform can safely and responsibly operate.

Components of the compliance management system 802 may include:

A data collection and storage component 804 is responsible for securely handling user data in a way that is compliant with GDPR, DSA, CCPA, and other privacy requirements. The data collection and storage component 804 includes the following sub-components:

Data Input Validation: This sub-component validates user input, ensuring that only necessary data is collected and stored. It uses algorithms to filter out any unnecessary information. The input validation sub-component can be designed to prevent the storage of personal information (e.g., biometric information) without explicit notification and consent from the user. To achieve this, the input validation sub-component can incorporate additional functionality including:

Consent Detection: Before collecting and processing biometric data, the input validation sub-component may check if explicit consent has been obtained from the user. This can be done by verifying the user's consent status in a compliance management system 802, or by checking for the presence of consent-related metadata associated with the biometric data.

Consent-Based Filtering: The input validation sub-component may allow biometric data to be stored only if the required consent has been obtained. If consent is absent, the sub-component filters out the biometric data and prevents it from being stored. This ensures that a platform only processes biometric data when appropriate consent has been given.

Notification and Consent Management: The input validation sub-component works with a consent (e.g., opt-in/opt-out) management system that handles user notifications and manages consent records. This system may notify users about the collection and use of biometric data, provide them with the option to give or withdraw their consent, and maintain a record of the users' consent status.

Opt-in/Opt-out Management: This sub-component handles user preferences and consents for data collection and processing. It provides users with mechanisms for opting in or out of specific data processing activities, in accordance with privacy regulations.

Secure Data Storage: This sub-component stores user data using encryption, ensuring that it is protected from unauthorized access. It may use a combination of symmetric and asymmetric encryption algorithms (e.g., Advanced Encryption Standard (AES) and Rivest-Shamir-Adleman (RSA)) for maximum security.

Data Retention Policy: This sub-component enforces a data retention policy, which specifies the duration for which user data is retained. After the specified duration, data is automatically deleted using secure deletion algorithms.

Data Minimization: This sub-component ensures that a minimum amount of data necessary for specific purposes is collected and stored. It adheres to the data minimization principle in various privacy regulations, reducing the risk of unauthorized access or misuse of excessive user data. This sub-component ensures that biometric data collection is limited to what is strictly necessary for the intended purpose, in compliance with privacy regulations.

Data Categorization and Classification: This sub-component categorizes and classifies user data using its sensitivity and the level of protection required. By assigning different levels of security to various data types, it helps ensure that sensitive data receives an appropriate level of protection. This sub-component also recognizes biometric data as a sensitive category of personal data and ensures that it is treated with the appropriate level of protection.

Data Inventory Management: This sub-component maintains an up-to-date inventory of all user data collected and stored, including information about the data's purpose, location, and retention period. It enables management and tracking of user data, simplifying compliance with privacy requirements.

Privacy Impact Assessment (PIA): This sub-component evaluates the potential privacy risks associated with new data collection and storage processes or technologies. By identifying and mitigating potential risks before implementing changes, it helps maintain compliance with privacy requirements and protect user data.

Data Transfer Management: This sub-component manages and secures data transfers between different systems, services, or third parties. It ensures that data transfers are compliant with privacy requirements and that data is protected during transit using encryption and other security measures.

A data access and processing component 806 is responsible for providing controlled access to user data and ensuring that data is processed in a compliant manner. The data access and processing component 806 may include the following sub-components:

Access Control: This sub-component manages user data access, granting access only to authorized users and services. It may use role-based access control (RBAC) to assign permissions using user roles and responsibilities.

Data Processing Management: This sub-component ensures that data processing is compliant with GDPR, DSA, CCPA, and other privacy regulations. It uses algorithms to automatically anonymize or pseudonymize user data when required, takes into account user opt-in/opt-out preferences, and logs data processing activities for auditing purposes. This sub-component also ensures that biometric data processing complies with specific requirements and restrictions set forth by GDPR, CCPA, and other privacy regulations. This may include obtaining explicit consent from the individual, processing for specific purposes, or anonymizing and pseudonymizing biometric data when required.

A data subject rights management component 808 is responsible for managing and facilitating user rights requests as per GDPR, DSA, CCPA, and other privacy regulations. The data subject rights management component 808 may include the following sub-components:

User Rights Request Processing: This sub-component processes user rights requests, such as data access, rectification, erasure, data portability, and opt-out requests. It uses algorithms to automatically validate and execute these requests, ensuring compliance and timely responses.

User Rights Request Logging: This sub-component logs all user rights requests and their outcomes, creating an audit trail that can be reviewed for compliance purposes.

A data breach detection and response component 810 is responsible for detecting and responding to data breaches in a timely and compliant manner. The data breach detection and response component 810 may include the following sub-components:

Data Breach Detection: This sub-component uses machine learning algorithms to continuously monitor and analyze the system for any signs of data breaches or unauthorized access.

Data Breach Response: This sub-component initiates predefined incident response procedures in case of a detected data breach. It ensures that the breach is contained, assessed, and reported to the relevant authorities as required by GDPR, DSA, CCPA, and other privacy regulations.

The compliance management system 802 is designed to provide a comprehensive solution for social media platforms to comply with GDPR, DSA, CCPA, and other privacy requirements. By implementing secure data collection and storage, controlled data access and processing, user rights management, and data breach detection and response components, the system ensures user privacy and data protection while enabling responsible platform operation. The inclusion of opt-in/opt-out management, along with other privacy controls, further empowers users to manage their data preferences and helps the platform maintain compliance with evolving privacy regulations.

Data Architecture

Figure 9:
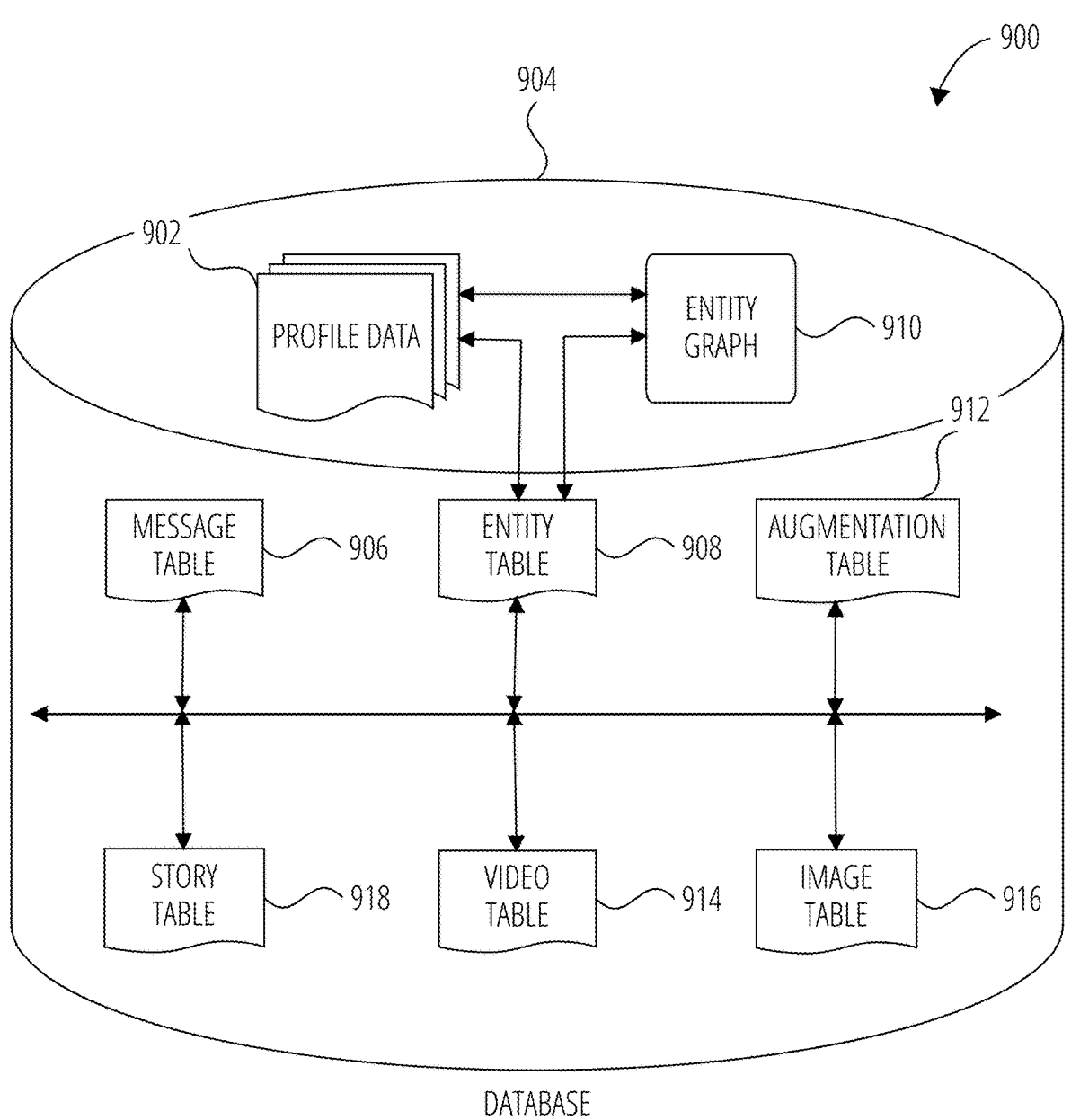
FIG. 9 is a diagrammatic representation of a data structure as maintained in a database, according to some examples.

FIG. 9 is a schematic diagram illustrating data structures 900, which may be stored in the database 904 of the interaction server system 110, according to certain examples. While the content of the database 904 is shown to comprise multiple tables, it will be appreciated that the data could be stored in other types of data structures (e.g., as an object-oriented database).

The database 904 includes message data stored within a message table 906. This message data includes, for any particular message, at least message sender data, message recipient (or receiver) data, and a payload. Further details regarding information that may be included in a message, and included within the message data stored in the message table 906, are described below with reference to FIG. 9.

An entity table 908 stores entity data, and is linked (e.g., referentially) to an entity graph 910 and profile data 902.

Entities for which records are maintained within the entity table 908 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 910 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 908. Such privacy settings may be applied to all types of relationships within the context of the interaction system 100, or may selectively be applied to only certain types of relationships.

The profile data 902 stores multiple types of profile data about a particular entity. The profile data 902 may be selectively used and presented to other users of the interaction system 100 based on privacy settings specified by a particular entity. Where the entity is an individual, the profile data 902 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 902 for the group may similarly include one or more avatar representations associated with the group, in addition to the group name, members, and various settings (e.g., notifications) for the relevant group.

The database 904 also stores augmentation data, such as overlays or filters, in an augmentation table 912. The augmentation data is associated with and applied to videos (for which data is stored in a video table 914) and images (for which data is stored in an image table 916).

Filters, in some examples, are overlays that are displayed as overlaid on an image or video during presentation to a message receiver. Filters may be of various types, including user-selected filters from a set of filters presented to a message sender by the interaction client 104 when the message sender is composing a message. Other types of filters include geolocation filters (also known as geo-filters), which may be presented to a message sender based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a message sender by the interaction client 104 based on other inputs or information gathered by the user system 102 during the message creation process. Examples of data filters include current temperature at a specific location, a current speed at which a message sender is traveling, battery life for a user system 102, or the current time.

Other augmentation data that may be stored within the image table 916 includes augmented reality content items (e.g., corresponding to applying Lenses or augmented reality experiences). An augmented reality content item may be a real-time special effect and sound that may be added to an image or a video.

As described above, augmentation data includes augmented reality (AR), virtual reality (VR) and mixed reality (MR) content items, overlays, image transformations, images, and modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire statespace of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a user device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, a computer animation model to transform image data can be used by a system where a user may capture an image or video stream of the user (e.g., a selfie) using the user system 102 having a neural network operating as part of an interaction client 104 operating on the user system 102. The transformation system operating within the interaction client 104 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the user system 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 918 stores data regarding collections of messages and associated image, video, or audio data, which are compiled into a collection (e.g., a story or a gallery). The creation of a particular collection may be initiated by a particular user (e.g., each user for which a record is maintained in the entity table 908). A user may create a "personal story" in the form of a collection of content that has been created and sent/broadcast by that user. To this end, the user interface of the interaction client 104 may include an icon that is user-selectable to enable a message sender to add specific content to his or her personal story.

A collection may also constitute a "live story," which is a collection of content from multiple users that is created manually, automatically, or using a combination of manual and automatic methodologies. For example, a "live story" may constitute a curated stream of user-submitted content from various locations and events. Users whose user devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 914 stores video data that, in some examples, is associated with messages for which records are maintained within the message table 906. Similarly, the image table 916 stores image data associated with messages for which message data is stored in the entity table 908. The entity table 908 may associate various augmentations from the augmentation table 912 with various images and videos stored in the image table 916 and the video table 914.

The databases 904 also include social network information collected by an interaction system of an interaction system. The social network information may include without limitation relationship and communication data for users of the interaction system. The social network information can be used to group two or more users and offer additional functionality of the interaction system 100. Examples of relationships include, but are not limited to, best friends relationships where two or more users are determined to be mutual best friends based on a frequency of their interactions, users who have common interests in current events, users who share an affiliation through social clubs or philanthropic organizations, and the like. Examples of communications include without limitation chats, private and public messages, exchanges of media such as images, videos, audio recordings, and the like.

Data Communications Architecture

Figure 10:
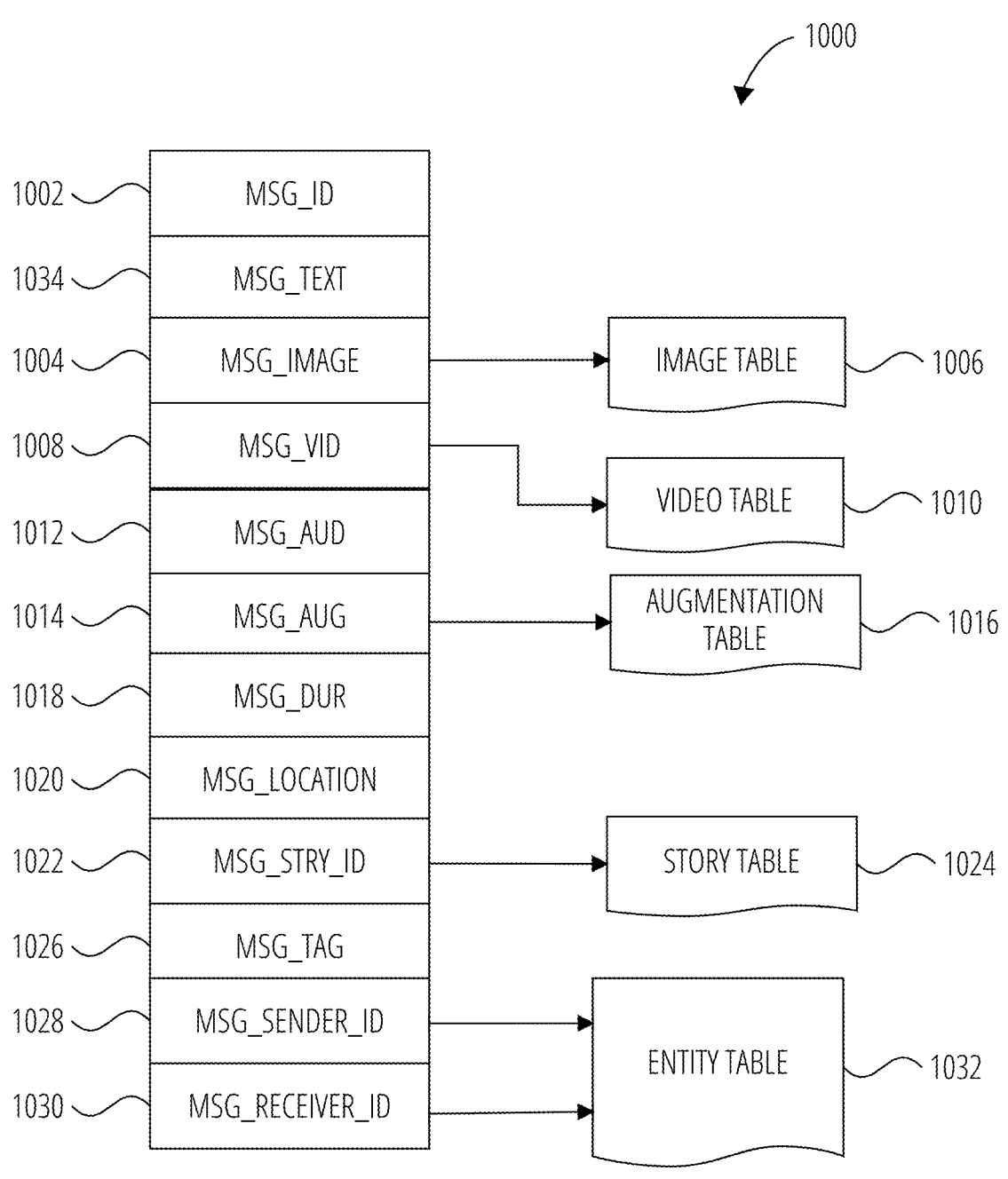
FIG. 10 is a diagrammatic representation of a message, according to some examples.

FIG. 10 is a schematic diagram illustrating a structure of a message 1000, according to some examples, generated by an interaction client 104 for communication to a further interaction client 104 via the interaction servers 124. The content of a particular message 1000 is used to populate the message table 906 stored within the database 904, accessible by the interaction servers 124. Similarly, the content of a message 1000 is stored in memory as "in-transit" or "in-flight" data of the user system 102 or the interaction servers 124. A message 1000 is shown to include the following example components:

Message identifier 1002: a unique identifier that identifies the message 1000.

Message text payload 1034: text, to be generated by a user via a user interface of the user system 102, and that is included in the message 1000.

Message image payload 1004: image data, captured by a camera component of a user system 102 or retrieved from a memory component of a user system 102, and that is included in the message 1000. Image data for a sent or received message 1000 may be stored in the image table 1006.

Message video payload 1008: video data, captured by a camera component or retrieved from a memory component of the user system 102, and that is included in the message 1000. Video data for a sent or received message 1000 may be stored in the video table 1010.

Message audio payload 1012: audio data, captured by a microphone or retrieved from a memory component of the user system 102, and that is included in the message 1000.

Message augmentation data 1014: augmentation data (e.g., filters, stickers, or other annotations or enhancements) that represents augmentations to be applied to message image payload 1004, message video payload 1008, or message audio payload 1012 of the message 1000. Augmentation data for a sent or received message 1000 may be stored in the augmentation table 1016.

Message duration parameter 1018: parameter value indicating, in seconds, the amount of time for which content of the message (e.g., the message image payload 1004, message video payload 1008, message audio payload 1012) is to be presented or made accessible to a user via the interaction client 104.

Message geolocation parameter 1020: geolocation data (e.g., latitudinal and longitudinal coordinates) associated with the content payload of the message. Multiple message geolocation parameter 1020 values may be included in the payload, each of these parameter values being associated with respect to content items included in the content (e.g., a specific image within the message image payload 1004, or a specific video in the message video payload 1008).

Message story identifier 1022: identifier values identifying one or more content collections (e.g., "stories" identified in the story table 1024) with which a particular content item in the message image payload 1004 of the message 1000 is associated. For example, multiple images within the message image payload 1004 may each be associated with multiple content collections using identifier values.

Message tag 1026: each message 1000 may be tagged with multiple tags, each of which is indicative of the subject matter of content included in the message payload. For example, where a particular image included in the message image payload 1004 depicts an animal (e.g., a lion), a tag value may be included within the message tag 1026 that is indicative of the relevant animal. Tag values may be generated manually, based on user input, or may be automatically generated using, for example, image recognition.

Message sender identifier 1028: an identifier (e.g., a messaging system identifier, email address, or device identifier) indicative of a user of the user system 102 on which the message 1000 was generated and from which the message 1000 was sent.

Message receiver identifier 1030: an identifier (e.g., a messaging system identifier, email address, or device identifier) indicative of a user of the user system 102 to which the message 1000 is addressed.

The contents (e.g., values) of the various components of message 1000 may be pointers to locations in tables within which content data values are stored. For example, an image value in the message image payload 1004 may be a pointer to (or address of) a location within an image table 1006. Similarly, values within the message video payload 1008 may point to data stored within a video table 1010, values stored within the message augmentation data 1014 may point to data stored in an augmentation table 1016, values stored within the message story identifier 1022 may point to data stored in a story table 1024, and values stored within the message sender identifier 1028 and the message receiver identifier 1030 may point to user records stored within an entity table 1032.

Machine Architecture

Figure 11:
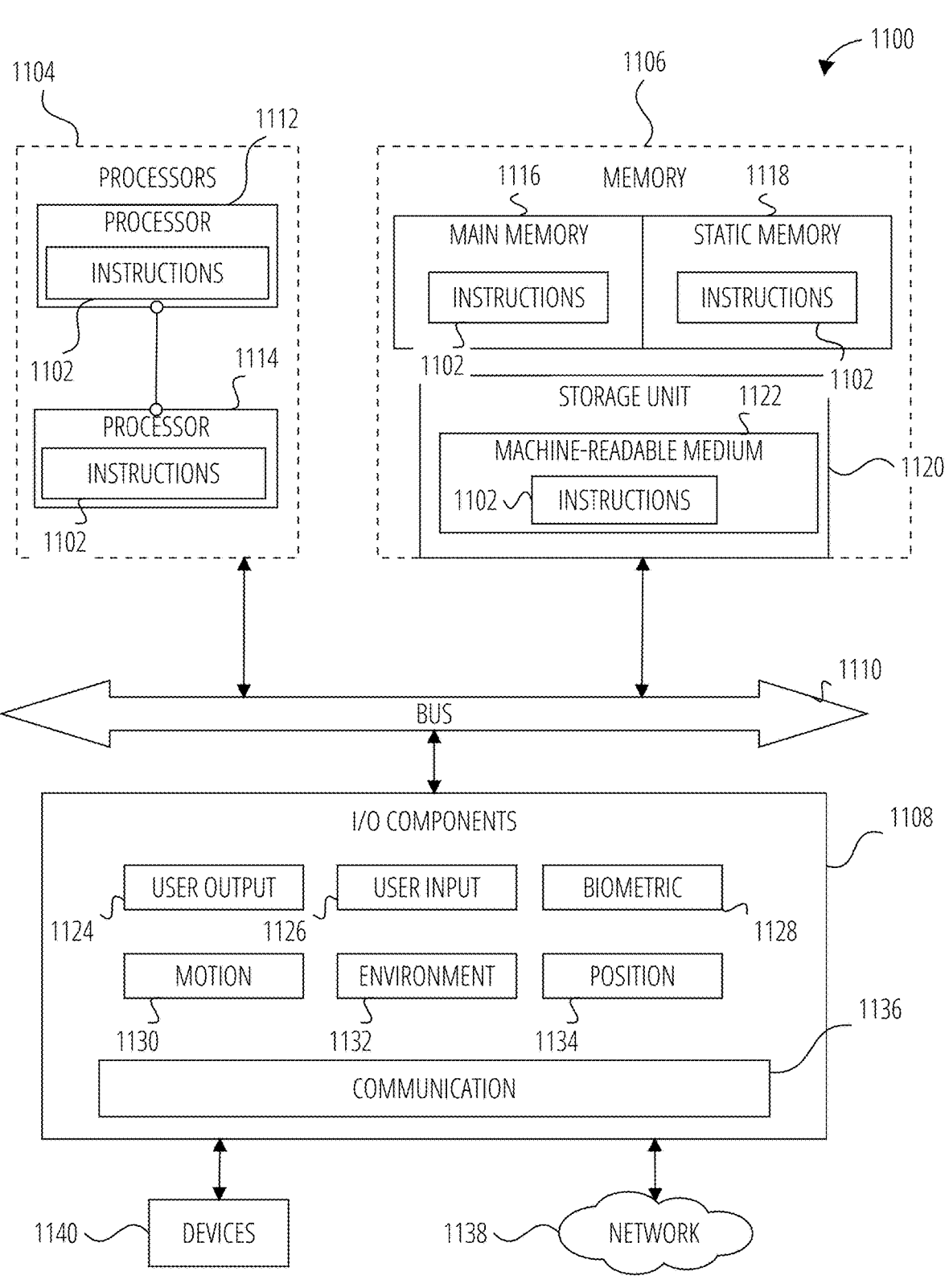
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a computing apparatus, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine" shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components

1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope). The biometric components may include a brain-machine interface (BMI) system that allows communication between the brain and an external device or machine. This is achieved by recording brain activity, translating it into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which involve surgically implanting electrodes directly into the brain.

Optogenetics BMIs, which use light to control the activity of specific nerve cells in the brain.

Functional magnetic resonance imaging (fMRI)-based BMIs, which use magnetic fields to measure blood flow in the brain, which can be used to infer brain activity.

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
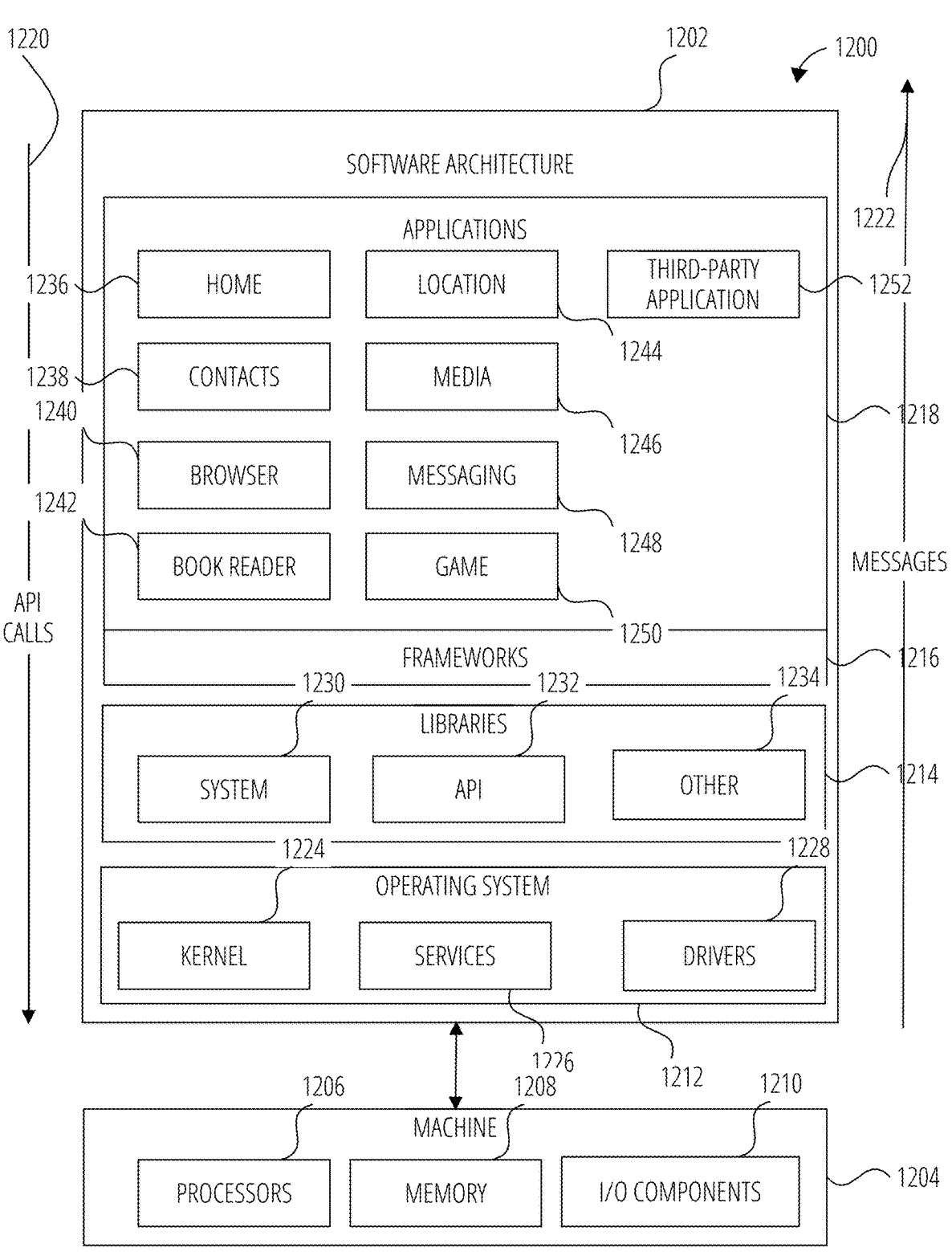
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system.

In this example, the third-party application 1252 can invoke the API calls 1220 provided by the operating system 1212 to facilitate functionalities described herein.

Further Examples Include

Example 1 is a computer-implemented method comprising: receiving, by one or more processors, from a user using a user device, a user interaction system post comprising an image; generating, by the one or more processors, a description of the user interaction system post using an image to text model; determining, by the one or more processors, a user intent based on the user interaction system post and the user interaction system post description; determining, by the one or more processors, to respond with a chatbot interaction system post using the user intent; in response to determining to respond with a chatbot interaction system post, generating, by the one or more processors, a prompt using the user interaction system post description; generating, by the one or more processors, an image description and a caption using the prompt; generating, by the one or more processors, the chatbot interaction system post using the image description and the caption; and providing, by the one or more processors, the chatbot interaction system post to the user via the user device.

In Example 2, the subject matter of Example 1 includes, generating, by the one or more processors, the prompt by appending one or more style instructions to the user interaction system post description.

In Example 3, the subject matter of any of Examples 1 and 2 includes, wherein the one or more style instructions comprise instructions to generate the chatbot interaction system post image in an interaction system post style.

In Example 4, the subject matter of any of Examples 1-3 includes, generating, by the one or more processors, an inappropriate content score for the user interaction system post using the user interaction system post and a sanitation model.

In Example 5, the subject matter of any of Example 1-4 includes, in response to detecting, by the one or more processors, that the inappropriate content score exceeds a threshold inappropriate content score value, providing, by the one or more processors, a text response indicating the user interaction system post cannot be processed.

In Example 6, the subject matter of any of Examples 1-5 includes, in response to detecting, by the one or more processors, that the inappropriate content score exceeds a threshold inappropriate content score value, modifying, by the one or more processors, a description of the user interaction system post to remove inappropriate content.

In Example 7, the subject matter of any of Examples 1-6 includes, randomly determining, by the one or more processors, whether to respond with a text response or the chatbot interaction system post.

Example 8 is at least one machine-readable medium including instructions that, when executed by processing circuitry, cause the processing circuitry to perform operations to implement any of Examples 1-7.

Example 9 is a system constructed to implement any of Examples 1-7.

CONCLUSION

Changes and modifications may be made to the disclosed examples without departing from the scope of the present disclosure. These and other changes or modifications are intended to be included within the scope of the present disclosure.

Glossary

"Carrier signal" refers to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"User device" refers to any machine that interfaces to a communications network to obtain resources from one or more server systems or other user devices. A user device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an advertisement hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

In this disclosure and appended claims, the terms "a" or "an" are used, as is common in patent documents, to include one or more than one, independent of any other instances or usages of "at least one" or "one or more." In this disclosure and appended claims, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the appended claims, the terms "including" and "comprising" are open-ended; that is, a system, device, article, or process that includes elements in addition to those listed after such a term in a claim is still deemed to fall within the scope of that claim.

What is claimed is:

1. A computer-implemented method comprising:
receiving, by one or more processors, from a user using a user device, a user interaction system post comprising an image;
generating, by the one or more processors, a description of the user interaction system post using an image to text model;
determining by the one or more processors, using the user interaction system post, that the user interaction system post includes inappropriate content;
in response to determining the user interaction system post includes inappropriate content, modifying, by the one or more processors, the description of the user interaction system post to remove the inappropriate content;
determining, by the one or more processors, a user intent based on the user interaction system post and the description of the user interaction system post as modified;
determining, by the one or more processors, to respond with a chatbot interaction system post using the user intent;
in response to determining to respond with a chatbot interaction system post, generating, by the one or more processors, a prompt using the description of the user interaction system post as modified;
generating, by the one or more processors, an image description and a caption using the prompt;
generating, by the one or more processors, the chatbot interaction system post using the image description and the caption; and providing, by the one or more processors, the chatbot interaction system post to the user via the user device.

2. The computer-implemented method of claim 1, further comprising: generating, by the one or more processors, the prompt by appending one or more style instructions to the user interaction system post description.

3. The computer-implemented method of claim 2, wherein the one or more style instructions comprise instructions to generate the chatbot interaction system post image in an interaction system post style.

4. The computer-implemented method of claim 1, further comprising:
generating, by the one or more processors, an inappropriate content score for the user interaction system post using the user interaction system post and a sanitation model.

5. The computer-implemented method of claim 4, further comprising:
in response to detecting, by the one or more processors, that the inappropriate content score exceeds a threshold inappropriate content score value, providing, by the one or more processors, a text response indicating the user interaction system post cannot be processed.

6. The computer-implemented method of claim 1, further comprising:
randomly determining, by the one or more processors, whether to respond with a text response or the chatbot interaction system post.

7. A machine, comprising:
one or more processors; and
one or more memories storing instructions that, when executed by the one or more processors, cause the machine to perform operations comprising:
receiving from a user using a user device, a user interaction system post comprising an image;
generating a description of the user interaction system post using an image to text model;
determining, using the user interaction system post, that the user interaction system post includes inappropriate content;
in response to determining the user interaction system post includes inappropriate content modifying the description of the user interaction system post to remove the inappropriate content;
determining a user intent based on the user interaction system post and the description of the user interaction system post as modified;
determining to respond with a chatbot interaction system post using the user intent;
in response to determining to respond with a chatbot interaction system post, generating a prompt using the description of the user interaction system post as modified;
generating an image description and a caption using the prompt,
generating the chatbot interaction system post using the image description and the caption; and
providing the chatbot interaction system post to the user via the user device.

8. The machine of claim 7, wherein the operations further comprise: generating the prompt by appending one or more style instructions to the user interaction system post description.

9. The machine of claim 8, wherein the one or more style instructions comprise instructions to generate the chatbot interaction system post image in an interaction system post style.

10. The machine of claim 7, wherein the operations further comprise:

generating an inappropriate content score for the user interaction system post using the user interaction system post and a sanitation model.

11. The machine of claim 10, wherein the operations further comprise:

in response to detecting that the inappropriate content score exceeds a threshold inappropriate content score value, providing a text response indicating the user interaction system post cannot be processed.

12. The machine of claim 7, wherein the operations further comprise:

randomly determining whether to respond with a text response or the chatbot interaction system post.

13. A machine-storage medium storing instructions that, when executed by one or more processors of a machine, cause the machine to perform operations comprising:

receiving from a user using a user device, a user interaction system post comprising an image;

generating a description of the user interaction system post using an image to text model;

determining, using the user interaction system post, that the user interaction system post includes inappropriate content;

in response to determining the user interaction system post includes inappropriate content, modifying the description of the user interaction system post to remove the inappropriate content;

determining a user intent based on the user interaction system post and the description of the user interaction system post as modified;

determining to respond with a chatbot interaction system post using the user intent;

in response to determining to respond with a chatbot interaction system post, generating a prompt using the description of the user interaction system post as modified;

generating an image description and a caption using the prompt;

generating the chatbot interaction system post using the image description and the caption; and providing the chatbot interaction system post to the user via the user device.

14. The machine-storage medium of claim 13, wherein the operations further comprise:

generating the prompt by appending one or more style instructions to the user interaction system post description.

15. The machine-storage medium of claim 14, wherein the one or more style instructions comprise instructions to generate the chatbot interaction system post image in an interaction system post style.

16. The machine-storage medium of claim 13, wherein the operations further comprise:

generating an inappropriate content score for the user interaction system post using the user interaction system post and a sanitation model.

17. The machine-storage medium of claim 16, wherein the operations further comprise:

in response to detecting that the inappropriate content score exceeds a threshold inappropriate content score value, providing a text response indicating the user interaction system post cannot be processed.

\* \* \* \* \*